United States Patent
Papasakellariou et al.

(10) Patent No.: US 8,873,362 B2
(45) Date of Patent: Oct. 28, 2014

(54) APPARATUS AND METHOD FOR ENHANCING FEATURES OF UPLINK REFERENCE SIGNALS

(75) Inventors: Aris Papasakellariou, Houston, TX (US); Joon-Young Cho, Suwon-si (KR)

(73) Assignee: Samsung Electronics Co., Ltd. (KR)

(*) Notice: Subject to any disclaimer, the term of this patent is extended or adjusted under 35 U.S.C. 154(b) by 501 days.

(21) Appl. No.: 12/986,620

(22) Filed: Jan. 7, 2011

(65) Prior Publication Data

US 2011/0164489 A1   Jul. 7, 2011

Related U.S. Application Data

(60) Provisional application No. 61/293,003, filed on Jan. 7, 2010.

(51) Int. Cl.
*H04J 11/00* (2006.01)
*H04L 5/00* (2006.01)
*H04W 72/04* (2009.01)

(52) U.S. Cl.
CPC ......... *H04W 72/0413* (2013.01); *H04L 5/0053* (2013.01)
USPC ............................. 370/203; 370/204; 370/208

(58) Field of Classification Search
USPC .......................................................... 370/203
See application file for complete search history.

(56) References Cited

U.S. PATENT DOCUMENTS

| | | | |
|---|---|---|---|
| 2008/0267165 A1* | 10/2008 | Bertrand et al. | 370/350 |
| 2008/0298502 A1* | 12/2008 | Xu et al. | 375/299 |
| 2008/0316957 A1* | 12/2008 | Shen et al. | 370/328 |
| 2009/0046805 A1 | 2/2009 | Kim et al. | |
| 2009/0196366 A1 | 8/2009 | Shen et al. | |
| 2009/0207784 A1 | 8/2009 | Lee et al. | |
| 2009/0262695 A1* | 10/2009 | Chen et al. | 370/329 |
| 2009/0262856 A1 | 10/2009 | Onggosanusi et al. | |
| 2010/0202559 A1* | 8/2010 | Luo et al. | 375/295 |
| 2012/0250656 A1* | 10/2012 | Noh et al. | 370/330 |

FOREIGN PATENT DOCUMENTS

EP          2479901 A2 *   7/2012

* cited by examiner

*Primary Examiner* — Yemane Mesfin
*Assistant Examiner* — Jeff Banthrongsack
(74) *Attorney, Agent, or Firm* — The Farrell Law Firm, P.C.

(57) ABSTRACT

Methods and apparatuses for configuring and transmitting Reference Signals (RS) accompanying data signals from User Equipments (UEs), such that Sounding Reference Signals (SRS) are transmitted from some UEs over a part of a possible transmission bandwidth, with or without the use of SRS bandwidth hopping.

14 Claims, 16 Drawing Sheets

APPARATUS AND METHOD FOR ENHANCING FEATURES OF UPLINK REFERENCE SIGNALS

PRIORITY

The present application claims priority under 35 U.S.C. §119(e) to U.S. Provisional Application No. 60/293,003, entitled "Enhancing Features of Uplink Reference Signals", which was filed in the U.S. Patent and Trademark Office on Jan. 7, 2010, the entire content of which is incorporated herein by reference.

BACKGROUND OF THE INVENTION

1. Field of the Invention

The present invention related generally to wireless communication systems and, more specifically, to enhancing the functionality of reference signals transmitted from a User Equipment (UE). The reference signals provide, in general, an estimate of a channel medium experienced by the UE at a given time.

2. Description of the Art

Several types of signals are supported for the proper functionality of a communication system. This includes data signals for conveying information content and control signals, which are transmitted from UEs to their respective serving Base Stations ((BSs) or Node Bs) in an UpLink (UL) of the communication system and from the serving Node Bs to the UEs in a DownLink (DL) of the communication system, for conveying information for processing the data signals. For example, control signals include positive or negative ACKnowledgement signals (ACK or NACK, respectively) that are transmitted in response to (correct or incorrect, respectively) data packet reception and are associated with a Hybrid Automatic Repeat reQuest (HARQ) process, i.e., HARQ-ACK and HARQ-NACK signals. Control signals also include Channel Quality Indication (CQI) signals that a UE sends to a Node B to provide information about DL channel conditions the UE experiences. Further, Reference Signals (RSs), also known as pilots, are typically transmitted to provide channel estimation and enable coherent demodulation for the transmitted data or control signals or, in the UL, to be used by the receiving Node B to measure the UL channel conditions that the UE experiences. The RS used for demodulation of data or control signals will be referred to as a DeModulation RS (DMRS), and the RS, which is typically wideband in nature, used for sounding the UL channel medium will be referred to as a Sounding RS (SRS).

A UE, e.g., a terminal or a mobile station, may be fixed or mobile and may be a wireless device, a cellular phone, a personal computer device, etc. A Node B is generally a fixed station, which may also be referred to as a Base Transceiver System (BTS), an Access Point (AP), or some other similar terminology.

UEs transmit signals conveying data or control information through a Physical Uplink Shared CHannel (PUSCH), and in the absence of PUSCH transmission, the UEs transmit control signals through a Physical Uplink Control CHannel (PUCCH). A UE receives signals conveying data information through a Physical Downlink Shared CHannel (PDSCH) and DL control signals are conveyed through a Physical Downlink Control CHannel (PDCCH).

A UE transmits data or control signals over a Transmission Time Interval (TTI), which may, for example, correspond to a sub-frame with a duration of 1 millisecond (msec).

FIG. 1 is a diagram illustrating a UL sub-frame structure for PUSCH transmission in a UL of a conventional communication system.

Referring to FIG. 1, a sub-frame 110 for PUSCH transmission includes two slots 120, each slot 120 including seven symbols. Each symbol 130 further includes a Cyclic Prefix (CP), which is used to mitigate interference due to channel propagation effects. Some symbols in each slot may be used for DMRS transmission or SRS transmission. For example, in FIG. 1, symbols 140 and 160 are used for DMRS transmission and symbol 150 is used for SRS transmission. Further, the second DMRS in the sub-frame, i.e., symbol 160, may or may not be transmitted with its negative value (scaled with "−1"), as will be described in more detail below.

The PUSCH transmission BandWidth (BW) includes frequency resource units, which will be referred to herein as Resource Blocks (RBs). In FIG. 1, each RB includes $N_{SC}^{RB}=12$ sub-carriers 170, also referred to as Resource Elements (REs). A UE may be allocated one or more consecutive RBs for PUSCH transmission and one RB for PUCCH transmission.

PUSCH transmission or PDSCH reception by a UE may be scheduled by a Node B dynamically through a respective Scheduling Assignment (SA) transmitted by the Node B using a Downlink Control Information (DCI) format in the PDCCH or through Semi-Persistent Scheduling (SPS). The DCI format informs a UE about a data packet transmission by the Node B in the PDSCH (i.e., a DL SA) or about a data packet transmission to the Node B (i.e., a UL SA) in the PUSCH. With SPS, a UE transmits or receives data packets at predetermined sub-frames.

FIG. 2 is a block diagram illustrating a conventional coding process of an SA at a Node B.

Referring to FIG. 2, a Medium Access Control (MAC) layer IDentity (ID) of the UE (or UE ID) masks a Cyclic Redundancy Check (CRC) of the SA information bits in order to enable the UE to identify that the SA is intended for it. The CRC computation 220 of the SA information bits 210 is performed and then the CRC is masked using the exclusive OR (XOR) operation 230 between CRC bits and UE ID bits 240, where XOR(0,0)=0, XOR(0,1)=1, XOR(1,0)=1, and XOR(1,1)=0. The masked CRC is appended 250 to the SA information bits, and channel coding (such as convolutional coding) 260 is performed. This is followed by rate matching 270 to the allocated PDCCH resources, and by interleaving and modulation 280. Finally, the SA is transmitted as a control signal 290. For ease of description, it is assumed that both the CRC and the UE ID have the same length, for example, 16 bits.

A UE receiver performs the reverse operations of the Node B transmitter to determine whether it has an SA assigned to it.

FIG. 3 is a block diagram illustrating a conventional decoding process of an SA at a UE.

Referring to FIG. 3, a received control signal 310 is demodulated and the resulting bits are de-interleaved 320. Rate matching 330, as applied at a Node B transmitter, is restored and followed by channel decoding 340. The SA bits 360 are then obtained after extracting the CRC bits 350, which are then de-masked by applying the XOR operation 370 with the UE ID 380. Finally, the UE performs a CRC test 390. If the CRC test passes, the UE concludes that the SA is valid and determines the parameters for signal reception (i.e., DL SA) or signal transmission (i.e., UL SA). If the CRC test does not pass, the UE disregards the received SA.

An example of a UL SA is provided in Table 1 below, in order to provide information about some of the Information Elements (IEs) typically included in a UL SA.

TABLE 1

IEs of a UL SA DCI format for PUSCH Transmission

| Information Element | Number of Bits | Comment |
|---|---|---|
| Resource Allocation | 11 | Assignment of Consecutive RBs |
| MCS | 5 | MCS Levels |
| NDI | 1 | New Data Indicator (synchronous HARQ) |
| TPC | 2 | Power control commands |
| Cyclic Shift Indicator | 3 | SDMA (maximum of 8 UEs) |
| Hopping Flag | 1 | Frequency Hopping (Yes/No) |
| CQI Request | 1 | Include CQI report (Yes/No) |
| CRC (UE ID) | 16 | UE ID masked in the CRC |
| TOTAL | 40 | |

The first IE provides a Resource Allocation (RA) in terms of RBs. Single Carrier Frequency Division Multiple Access (SC-FDMA) is assumed where the signal transmission BW is contiguous. For an operating BW of $N_{RR}^{UL}$ RBs, the number of possible contiguous RB allocations to a UE is $1+2+\ldots = N_{RB}^{UL}(N_{RB}^{UL}+1)/2$ and can be signaled with $\lceil \log_2(N_{RB}^{UL}(N_{RR}^{UL}+1)/2) \rceil$ bits, where $\lceil \ \rceil$ denotes a ceiling operation that rounds a number to its next higher integer. For example, for $N_{RR}^{UL}=50$ RBs, the number of required RA IE bits is 11. In general, regardless of the transmission method, the UL SA is assumed to include an RA IE.

The second IE provides a Modulation and Coding Scheme (MCS). For example, the modulation may be Quadrature Phase Shift Keying (QPSK), Quadrature Amplitude Modulation (QAM)16, or QAM64 and the coding rate may take discrete values between 1/16 and 1.

The third IE is a New Data Indicator (NDI). The NDI is set to 1 when the UE should transmit a new Transport Block (TB) and is set to 0 when the UE should transmit the same TB as in a previous PUSCH transmission (synchronous UL HARQ is assumed).

The fourth IE provides a Transmit Power Control (TPC) command for PUSCH and SRS transmission power adjustments.

The fifth IE is a Cyclic Shift Indicator (CSI) indicating a Cyclic Shift (CS) for the transmission of a Constant Amplitude Zero Auto-Correlation (CAZAC) sequence used as a DMRS. As will be described below, using a different CS of a CAZAC sequence can provide orthogonal multiplexing of a respective RS.

The sixth IE, Hopping Flag, indicates whether frequency hopping applies to the PUSCH transmission.

The seventh IE, CQI Request, indicates whether the UE should include a DL CQI report in the PUSCH transmission.

In order for a Node B to properly determine RBs and MCS for PUSCH transmission from a UE, the Node B estimates a UL channel medium experienced by the UE (i.e., a UL CQI) over at least a part of the operating BW to obtain a respective Signal-to-Interference and Noise Ratio (SINR) estimate. This UL CQI is typically obtained by the Node B using an SRS transmitted by the UE.

FIG. 4 is a diagram illustrating a conventional SRS multiplexing method in a UL sub-frame. Specifically, FIG. 4 illustrates an SRS transmission occurring in a last sub-frame symbol of every 2 sub-frames 460, 465.

Referring to FIG. 4, UE1 and UE2 multiplex PUSCH transmissions in different BWs during a first sub-frame 401, UE2 and UE3 multiplex PUSCH transmissions in different BWs during a second sub-frame 402, and UE4 and UE5 multiplex PUSCH transmissions in different BWs during a third sub-frame 403. That is, UE 1 data 410 and UE 2 data 420 are transmitted in different BWs in the first sub-frame 401, UE 2 data 420 and UE 3 data 430 are transmitted in different BWs in the second sub-frame 402, and UE 4 data 440 and UE 5 data 455 are transmitted in different BWs in the third sub-frame 403. Accordingly, UE1, UE2, UE3, UE4, and UE5 respectively transmit DMRSs 415, 425, 435, 445, and 455. UEs with SRS transmission may or may not have PUSCH transmission in the same sub-frame and, if they co-exist in the same sub-frame, SRS and PUSCH transmissions may be located at different BWs.

It is assumed herein that the RS (DMRS or SRS) is constructed from CAZAC sequences. An example of such sequences is given by Equation (1).

$$c_k(n) = \exp\left[\frac{j2\pi k}{L}\left(n + n\frac{n+1}{2}\right)\right] \quad (1)$$

In Equation (1), L is a length of a CAZAC sequence, n is an index of a sequence element, $n=\{0, 1, 2, \ldots, L-1\}$, and k is a sequence index. For CAZAC sequences of prime length L, the number of sequences is L−1. Therefore, an entire family of sequences is defined as k ranges in $\{1, 2, \ldots, L-1\}$. However, the sequences for DMRS or SRS transmission are not only generated using Equation (1).

For example, as 1 RB is assumed to include $N_{SC}^{RB}=12$REs, CAZAC-based sequences can be generated either by truncating a longer prime length (such as length 13) CAZAC sequence or by extending a shorter prime length (such as length 11) CAZAC sequence by repeating its first element(s) at the end (cyclic extension), although the resulting sequences do not strictly fulfill the definition of a CAZAC sequence. Alternatively, CAZAC sequences can be generated through a computer search for sequences satisfying the CAZAC properties.

FIG. 5 is a block diagram illustrating a conventional RS transmission process. Specifically, FIG. 5 illustrates a DMRS or SRS transmission process at a UE, based on a CAZAC sequence.

The frequency domain version of a CAZAC sequence may be obtained by applying a Discrete Fourier Transform (DFT) to its time domain version. By choosing non-consecutive REs, a comb spectrum can be obtained for either the DMRS or for the SRS. The number of combs is referred to as the Repetition Factor (RPF). A comb spectrum is useful for orthogonally multiplexing (through frequency division) overlapping SRS transmissions with unequal BWs. Such SRS are constructed by CAZAC sequences of different lengths, which cannot be orthogonally multiplexed using different CS.

Referring to FIG. 5, a frequency domain CAZAC sequence 510 is generated, the REs in the assigned transmission BW 530 are selected by subcarrier mapping 520, the Inverse Fast Fourier Transform (IFFT) is performed 540, the CS 550 is applied, CP 560 and filtering 570 are applied, and the generated signal is transmitted 580. The UE also applies zero padding in REs where the DMRS or the SRS is not transmitted (not shown). For brevity, additional transmitter circuitry such as digital-to-analog converter, analog filters, amplifiers, and transmitter antennas, as they are known in the art, are not illustrated.

A Node B receiver performs reverse functions of the UE transmitter.

FIG. 6 is a block diagram illustrating a conventional RS reception process. Specifically, FIG. 6 illustrates reverse operations of those illustrated in FIG. 5.

Referring to FIG. 6, an antenna receives a Radio-Frequency (RF) analog signal and after passing processing units such as filters, amplifiers, frequency down-converters, and analog-to-digital converters (not shown) the resulting digital received signal 610 passes through a time windowing unit 620 and the CP is removed 630. Subsequently, the CS of the transmitted CAZAC-based sequence is restored 640, a Fast Fourier Transform (FFT) 650 is applied, the selection through controlling reception bandwidth 660 for the transmitted REs is performed by subcarrier mapping 665, and correlation by multiplying 670 with the CAZAC-based sequence replica 680 is applied. Finally, the output 690 is obtained, which can be passed to a channel estimation unit, such as a time-frequency interpolator (for a DMRS), or a UL CQI estimator (for an SRS).

Different CSs of a CAZAC sequence provide orthogonal sequences. Therefore, for a given CAZAC sequence, different CSs can be allocated to different UEs and achieve orthogonal multiplexing of the transmitted by these UEs in the same RBs. This principle is illustrated in FIG. 7.

FIG. 7 is a diagram illustrating conventional orthogonal RS multiplexing using different cyclic shifts of a CAZAC sequence.

Referring to FIG. 7, in order for multiple CAZAC sequences 710, 730, 750, and 770 generated correspondingly from multiple CSs 720, 740, 760, and 780 of a same CAZAC sequence to be orthogonal, the CS value Δ 790 should exceed the channel propagation delay spread D (including a time uncertainty error and filter spillover effects). If $T_S$ is the duration of one symbol, the number of CSs is equal to $\lfloor T/D \rfloor$ where $\lfloor \ \rfloor$ denotes a "floor" operation, which rounds a number to its lower integer.

Multi-User Multiple-Input Multiple-Output (MU-MIMO) can substantially improve the spectral efficiency of a communication system. With MU-MIMO, PUSCH transmissions from multiple UEs share at least part of a BW. MU-MIMO is facilitated if a Node B can obtain interference-free estimates of a channel medium experienced by MU-MIMO UEs. This requires orthogonal reception for the respective DMRS. If the PUSCH transmissions from MU-MIMO UEs share exactly the same BW, orthogonal DMRS multiplexing can be obtained using different CS of the same CAZAC-based sequence. The CSI IE in a UL SA indicates the CS. However, if the PUSCH transmissions from MU-MIMO UEs do not share exactly the same BW, orthogonal DMRS multiplexing using different CS is not possible as the respective CAZAC sequences have different lengths. However, the application of Orthogonal Covering Codes (OCC) in a time domain to the DMRS transmission can also provide orthogonal DMRS multiplexing. For example, using the sub-frame structure illustrated in FIG. 1, which has 2 DMRS symbols, the OCCs can be {1, 1} and {1, −1}. As for the CS, the UL SA should indicate the OCC for the DMRS transmission in the PUSCH.

An SRS transmission BW may depend on a UL SINR experienced by the UE. For UEs with low UL SINR, a Node B may assign a small SRS transmission BW, in order to provide a relatively large ratio of transmitted SRS power per BW unit, thereby improving a quality of a UL CQI estimate obtained from the SRS. Conversely, for UEs with high UL SINR, the Node B may assign a large SRS transmission BW because good UL CQI estimation quality can be achieved from the SRS while obtaining this estimate over a large BW.

Several combinations for the SRS transmission BW may be supported, as shown in Table 2 below.

A Node B may signal a configuration c through a broadcast channel. For example, 3 bits can indicate one of the eight configurations. The Node B can then individually assign to each UE one of the possible SRS transmission BWs $m_{SRS,b}^c$ (in RBs) by indicating the value of b for configuration c. Therefore, the Node B can multiplex SRS transmissions from UEs in the BWs $m_{SRS,0}^c$, $m_{SRS,1}^c$, $m_{SRS,2}^c$, and $m_{SRS,3}^c$ (b=0, b=1, b=2, and b=3, respectively, in Table 2).

TABLE 2

Example of $m_{SRS,b}^c$ RBs values for UL BW of $N_{RB}^{UL}$ RBs with $80 < N_{RB}^{UL} \leq 110$.

| SRS BW configuration | b = 0 | b = 1 | b = 2 | b = 3 |
| --- | --- | --- | --- | --- |
| c = 0 | 96 | 48 | 24 | 4 |
| c = 1 | 96 | 32 | 16 | 4 |
| c = 2 | 80 | 40 | 20 | 4 |
| c = 3 | 72 | 24 | 12 | 4 |
| c = 4 | 64 | 32 | 16 | 4 |
| c = 5 | 60 | 20 | Not Applicable | 4 |
| c = 6 | 48 | 24 | 12 | 4 |
| c = 7 | 48 | 16 | 8 | 4 |

A variation in a maximum SRS BW is primarily intended to accommodate a varying PUCCH size. The PUCCH is assumed to be transmitted at the two edges of the operating BW and to not be interfered with by the SRS. Therefore, the larger the PUCCH size (in RBs), the smaller the maximum SRS transmission BW.

FIG. 8 is a diagram illustrating conventional multiplexing of SRS transmissions in various bandwidths. Specifically, FIG. 8 further illustrates the concept of multiple SRS transmission BWs for configuration c=3 from Table 2.

Referring to FIG. 8, the PUCCH is located at the two edges, 802 and 804, of the operating BW and a UE is configured SRS transmission BWs with either $m_{SRS,0}^b$=72 RBs 812, or $m_{SRS,1}^b$=24 RBs 814, or $m_{SRS,2}^b$=12 RBs 816, or $m_{SRS,3}^b$=4 RBs 818. A few RBs, 806 and 808, may not be sounded but this usually does not affect the Node B's ability to schedule PUSCH transmissions in those RBs, as the respective UL SINR may be interpolated from nearby RBs with SRS transmission. For SRS BWs other than the maximum one, the Node B also assigns the starting frequency position of the SRS transmission to a UE.

The SRS transmission parameters for each UE are assumed to be configured by the Node B through higher layer signaling, for example, through Radio Resource Control (RRC) signaling. These SRS transmission parameters may include the transmission BW, the comb (if the SRS has a comb spectrum), the CS, the starting BW position, the period (for example one SRS transmission every 5 sub-frames), the starting sub-frame (for example the first sub-frame in a set of 1000 sub-frames), and an indication of whether frequency hopping according to a predetermined pattern is enabled between successive SRS transmissions.

In order to satisfy a service quality that is largely independent of the UE location in a cell, Inter-Cell Interference Coordination (ICIC) based on soft frequency reuse for the allocation of RBs in adjacent cells can mitigate the inter-cell interference experienced by UEs located near the cell edge. The allocation of some RBs to each cell for exclusive use by cell-edge UEs can be through semi-static or dynamic network coordination, taking into account the distribution (location and/or transmit power requirements) and throughput requirements of cell-edge UEs.

FIG. 9 illustrates a conventional application of frequency-domain ICIC.

Referring to FIG. 9, a UL operating BW 910 is divided into 6 sets of RBs, with the first and fourth sets allocated to cell-edge UEs of cell 1 920, the second and fifth sets allocated to cell-edge UEs of cells 2, 4, and 6 930, and the third and sixth sets allocated to cell-edge UEs of cell 3, 5, and 7 940. The RB sets are not contiguous due to implementation reasons or to maximize frequency diversity. A Node B may use the RBs over the entire UL operating BW to schedule PUSCH from cell-interior UEs, but may only use the allocated sets of RBs to schedule PUSCH from cell-edge UEs.

FIG. 10 is a diagram illustrating a conventional heterogeneous network.

ICIC is beneficial in heterogeneous networks, as illustrated in FIG. 10, where a macro-cell served by a macro-Node B 1010 encompasses micro-cells served by respective micro-Node Bs 1020 and 1030. As the macro-Node B covers a larger area than a micro-Node B, a UE connected to the macro-Node B (macro-UE) may transmit its signals with substantially higher power than a UE connected to a micro-Node B (micro-UE). Macro-UEs can therefore cause significant interference to micro-UEs especially if they are both located near their cell edge.

With conventional SRS hopping methods, the SRS transmission hops over a maximum configured SRS BW (the SRS transmission with BW $m_{SRS,b}$, b>0, hops over a BW defined by $m_{SRS,0}$). This is clearly inefficient for ICIC as cell-interior UEs should transmit SRS over substantially the entire operating BW used for PUSCH transmissions and cell-edge UEs should transmit SRS only in a part of the operating BW. Even more importantly, for heterogeneous networks, allowing SRS transmission by macro-UEs near a micro-cell to hop over an entire operating BW can create significant interference to the SRS transmissions by micro-UEs. Therefore, it is beneficial to enable SRS hopping with non-maximum transmission BW only in parts of the maximum configured SRS transmission BW.

Frequency-domain scheduling can exploit frequency selectivity of a channel and PUSCH scheduling can be in parts of an operating BW where a respective SINR is optimized according to a scheduler metric (such as for example a proportional-fair metric). In order to enable PUSCH scheduling over non-contiguous parts of the operating BW, it is beneficial to enable simultaneous SRS transmissions over non-contiguous BWs. This does not impact the SRS multiplexing capacity and does not increase the SRS overhead assuming that the total BW of SRS transmission remains the same.

Therefore, a need exists for a method to enable SRS transmissions over non-contiguous BWs.

Another need exists for a method to enable hopping of SRS transmissions over a BW smaller than a maximum SRS transmission BW.

Additionally, a need exists for a method to enable a UL SA to indicate an OCC a UE should apply to a DMRS transmission in a PUSCH.

SUMMARY OF THE INVENTION

Accordingly, the present invention has been designed to address at least some of the above described problems in the prior art and the present invention provides methods and apparatus to support a configuration of DMRS transmission parameters, through the application of a CS and an OCC, to support SRS bandwidth hopping only in parts of a maximum SRS bandwidth, and to enable simultaneous SRS transmissions from a same UE over non-contiguous parts of an operating bandwidth.

An aspect of the present invention is to provide a Node B that dynamically assigns, using an Information Element (IE) in a Downlink Control Information (DCI) format transmitted in a PDCCH and decoded by a respective UE, the CS and/or the OCC the UE applies to the DMRS transmission that uses a CAZAC sequence, where different CSs are always associated with different OCCs and the same IE is used to configure either both a CS and an OCC or only an OCC for the DMRS transmission by a UE.

Another aspect of the present invention is to provide a bandwidth hopping pattern of an SRS transmitted by a UE that is constrained so that the SRS transmission bandwidth is only in specific parts of the maximum bandwidth allowed for SRS transmissions. The SRS bandwidth pattern may be the same regardless if the SRS transmission from a UE is restricted to be only in specific parts of the maximum bandwidth allowed for SRS transmissions or not, or a different SRS bandwidth hopping pattern may be used by the UE in each case (bandwidth restricted or bandwidth unrestricted SRS transmission).

Another aspect of the present invention is to provide a UE that is configured to simultaneously transmit multiple SRS over respective multiple non-contiguous bandwidths. Some of the multiple SRS can be transmitted at the same bandwidth at different SRS transmission instances and the remaining SRS may be transmitted according to an SRS bandwidth hopping pattern.

In accordance with an aspect of the present invention, a method for assigning a first Cyclic Shift (CS) and a first Orthogonal Cover Code (OCC) to a first User Equipments (UE) for a first Reference Signal (RS) transmission and a second CS and a second OCC to a second UE for a second RS transmission is provided in a communication system wherein a Base Station (BS) transmits in Physical Downlink Control Channels (PDCCHs) a respective set of Downlink Control Information (DCI) formats to a plurality of UEs, wherein each DCI format from a subset of the set of DCI formats includes Information Elements (IEs) configuring data and RS transmissions from the plurality of UEs to the BS, and wherein the IEs includes binary elements and an RS Configuration (RSC) IE assigning a CS and an OCC for an RS transmission by a UE. The method includes indicating, by the BS, through an RSC IE included in a first DCI format from a subset of the set of DCI formats, the first CS and the first OCC for the first RS transmission by the first UE, and indicating, by the BS, through an RSC IE in a second DCI format from a subset of the set of DCI formats, the second CS and the second OCC for the second RS transmission by the second UE. The first CS is different than the second CS, and the first OCC is different than the second OCC.

In accordance with another aspect of the present invention, a method for restricting a Reference Signal (RS) bandwidth size and an RS bandwidth location is provided in a communication system wherein a User Equipment (UE) transmits an RS to a Base Station (BS), the RS bandwidth size being less than or equal to a predefined maximum RS bandwidth size. The method includes transmitting, by the UE, an RS with a first bandwidth size and in a first bandwidth location in a first set of sub-frames, and transmitting, by the UE, an RS with a second bandwidth size and in a second bandwidth location in a second set of sub-frames. The second bandwidth size is smaller than the predefined maximum RS bandwidth size.

In accordance with another aspect of the present invention, a method for a User Equipment (UE) to determine a bandwidth location for a Reference Signal (RS) transmission from a set of bandwidth locations is provided in a communication system wherein the UE transmits an RS to a Base Station (BS). The method includes determining, by the UE, a number of RS bandwidth locations according to a bandwidth location hopping pattern, starting from a predetermined bandwidth location for an initial RS transmission or from a next bandwidth location, determined according to a hopping pattern relative to a bandwidth location of a last RS transmission, until a bandwidth location that belongs in a set of bandwidth locations is identified, and transmitting, by the UE, an RS in an identified bandwidth location.

In accordance with another aspect of the present invention, a method for a first User Equipment (UE) to transmit a first User Equipments (UEs) over a first bandwidth and for a second UE to transmit a second RS over a second bandwidth is provided in a communication system, wherein a plurality of UEs transmit RSs to a Base Station (BS). The method includes transmitting, by the first UE, the first RS according to a first bandwidth hopping pattern spanning the first bandwidth, and transmitting, by the second UE, the second RS according to a second bandwidth hopping pattern spanning the second bandwidth. The first bandwidth is larger than the second bandwidth and includes at least a portion of the second bandwidth.

In accordance with another aspect of the present invention, a method for a User Equipment (UE) to transmit Reference Signals (RSs) during a same transmission symbol of a Transmission Time Interval (TTI) is provided in a communication system wherein the UE communicates with a Base Station (BS). The method includes informing, by the BS, the UE of multiple non-contiguous bandwidth locations for simultaneous RS transmission, and transmitting, by the UE, multiple RSs at the multiple non-contiguous bandwidth locations. At least some of the multiple RSs have a bandwidth size that is different than a bandwidth size of other signals that the UE may transmit in a same TTI.

In accordance with another aspect of the present invention, a User Equipment (UE) apparatus is provided for transmitting a Reference Signal (RS) having a bandwidth size that is equal to or smaller than a predefined maximum RS bandwidth size. The UE apparatus includes a transmitter for transmitting an RS with a first bandwidth size and in a first bandwidth location in a first set of sub-frames, and transmitting an RS with a second bandwidth size and in a second bandwidth location during a second set of sub-frames. The second bandwidth size is smaller than the predefined maximum RS bandwidth size.

In accordance with another aspect of the present invention, a User Equipment (UE) apparatus is provided for transmitting a Reference Signal (RS) at a bandwidth location from a set of bandwidth locations. The UE apparatus includes a bandwidth location evaluation unit for determining a number of RS bandwidth locations according to a bandwidth location hopping pattern, starting from a predetermined bandwidth location for an initial RS transmission or from a next bandwidth location determined according to a hopping pattern relative to a bandwidth location of a last RS transmission, until a bandwidth location that belongs in a set of bandwidth locations is identified, and a transmitter for transmitting the RS in an identified bandwidth location.

In accordance with another aspect of the present invention, a User Equipment (UE) apparatus is provided for transmitting a Reference Signal (RS) over a first bandwidth or over a second bandwidth. The UE includes a transmitter for transmitting an RS according to a first bandwidth hopping pattern spanning the first bandwidth, and for transmitting an RS according to a second bandwidth hopping pattern spanning a second bandwidth. The first bandwidth is larger than the second bandwidth and includes at least a portion of the second bandwidth.

In accordance with another aspect of the present invention, a User Equipment (UE) apparatus is provided for transmitting Reference Signals (RSs) during a same transmission symbol of a Transmission Time Interval (TTI), wherein each of the RSs has a bandwidth size that is different than a bandwidth size of other signals that the UE apparatus may transmit in the same TTI. The UE apparatus includes a transmitter for transmitting an RS in a first mode over a contiguous bandwidth, and transmitting an RS in a second mode at multiple non-contiguous bandwidth locations.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
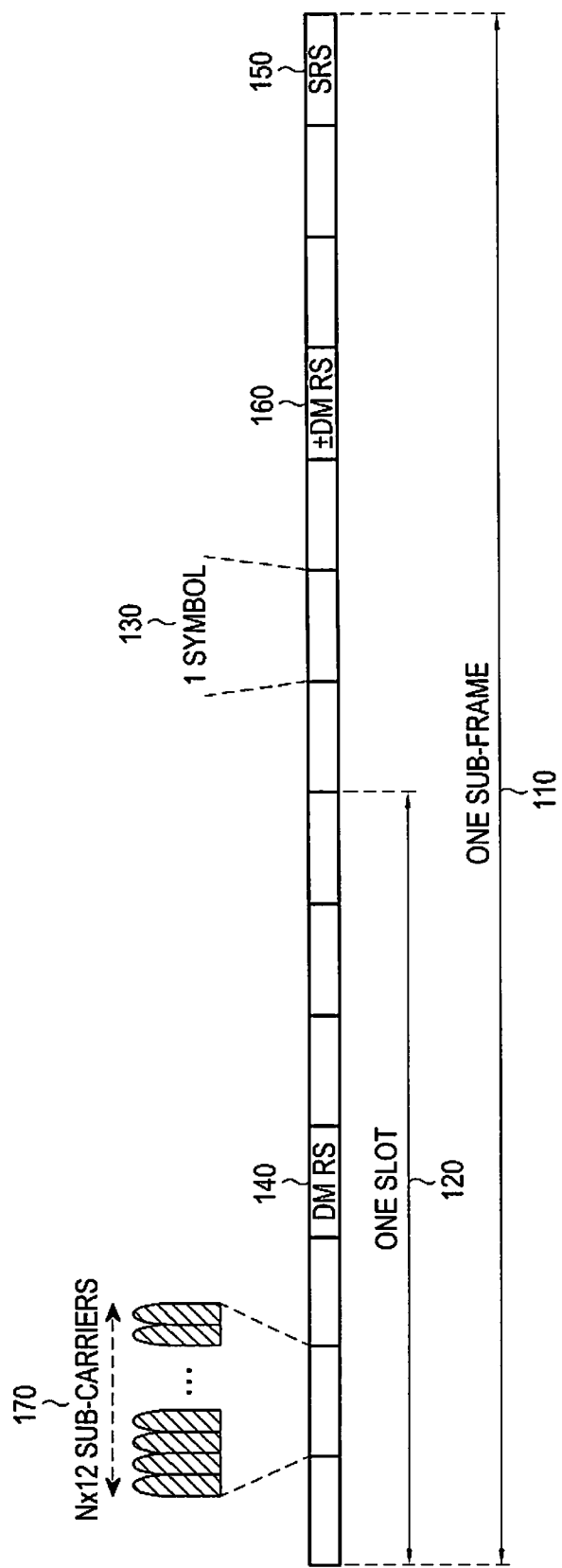
FIG. 1 is a diagram illustrating a UL sub-frame structure for PUSCH transmission in a UL of a conventional communication system.
Figure 2:
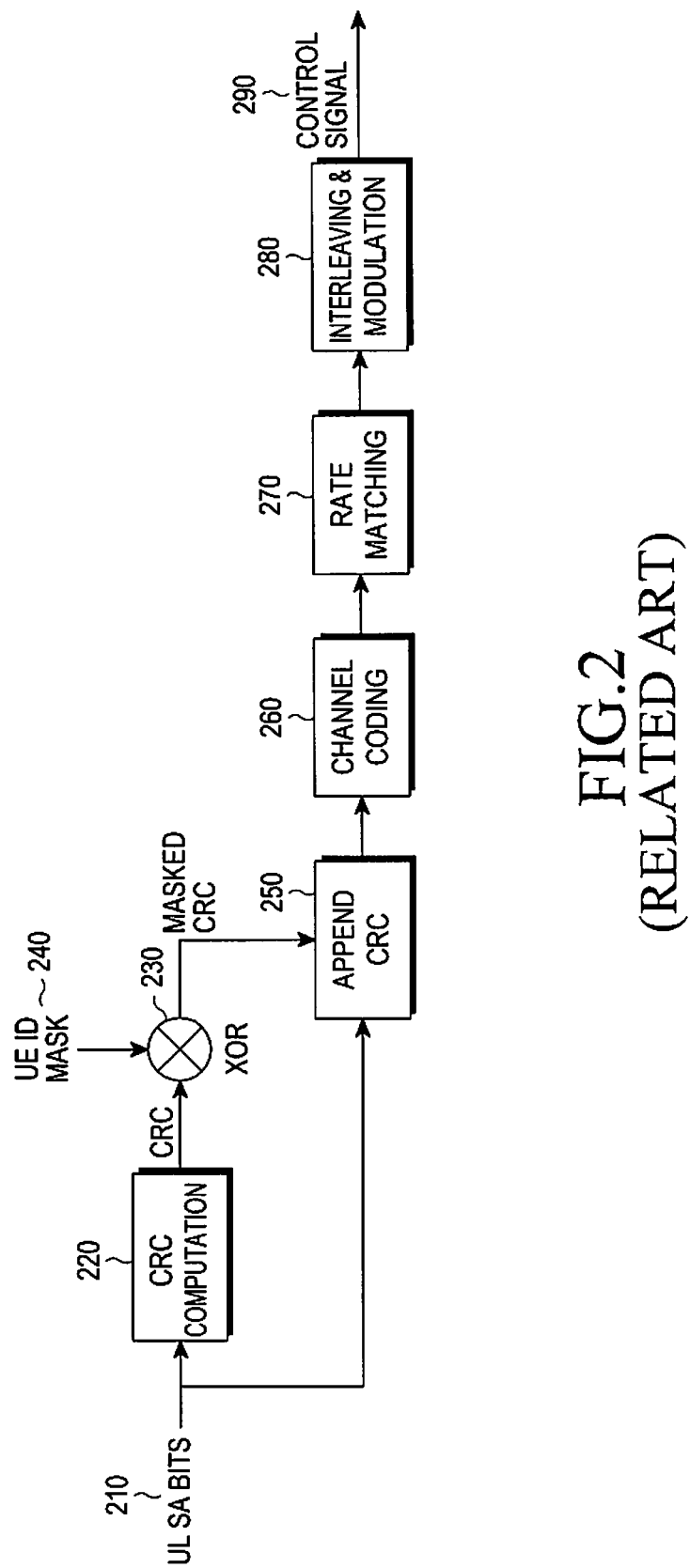
FIG. 2 is a block diagram illustrating a conventional coding process of an SA at a Node B.
Figure 3:
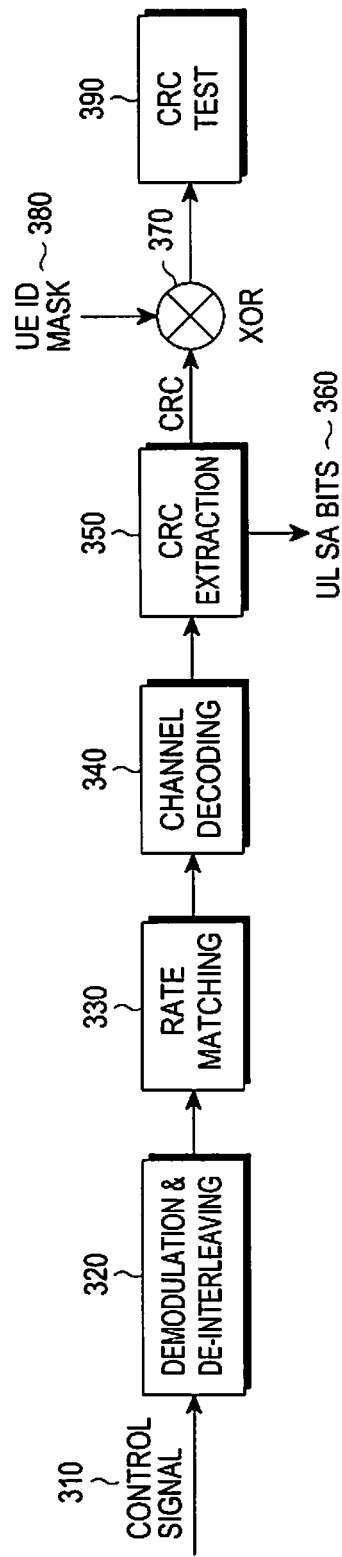
FIG. 3 is a block diagram illustrating a conventional decoding process of an SA at a UE.
Figure 4:
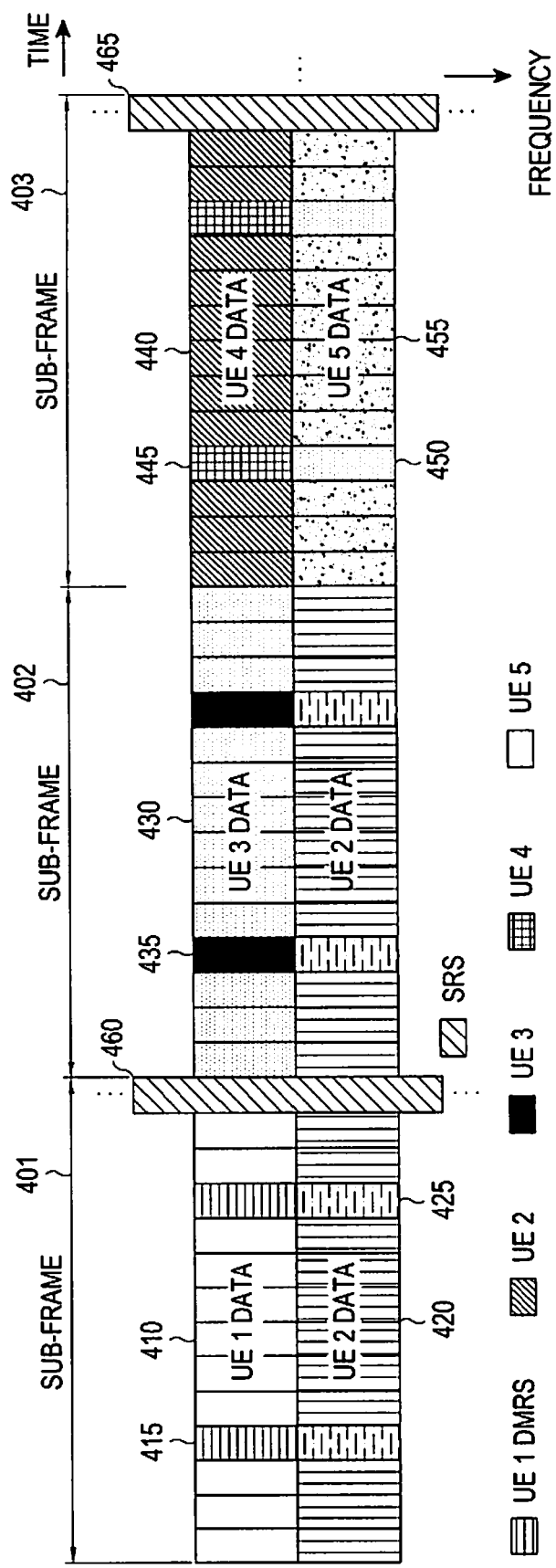
FIG. 4 is a diagram illustrating a conventional SRS multiplexing method in a UL sub-frame.
Figure 5:
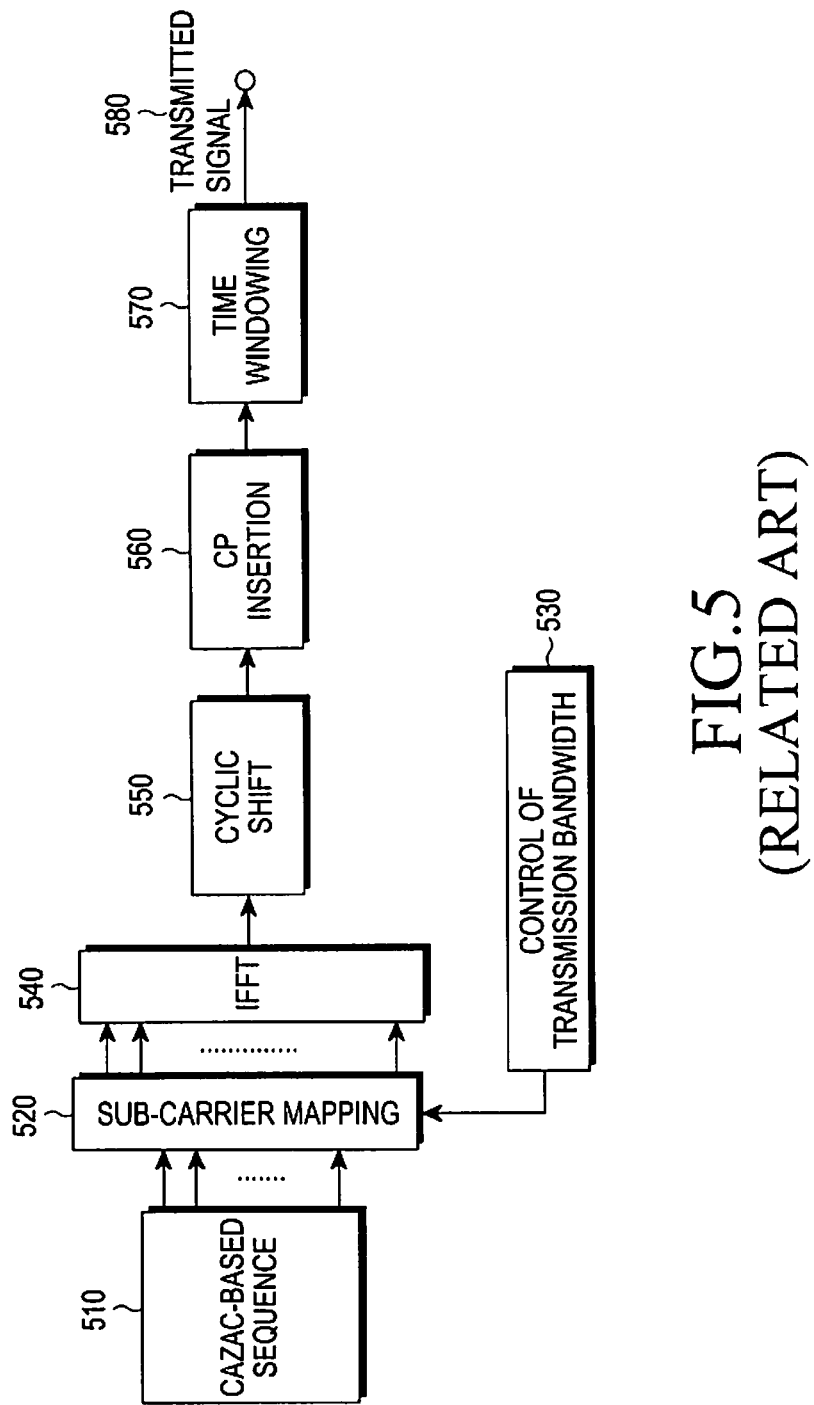
FIG. 5 is a block diagram illustrating a conventional RS transmission process.
Figure 6:
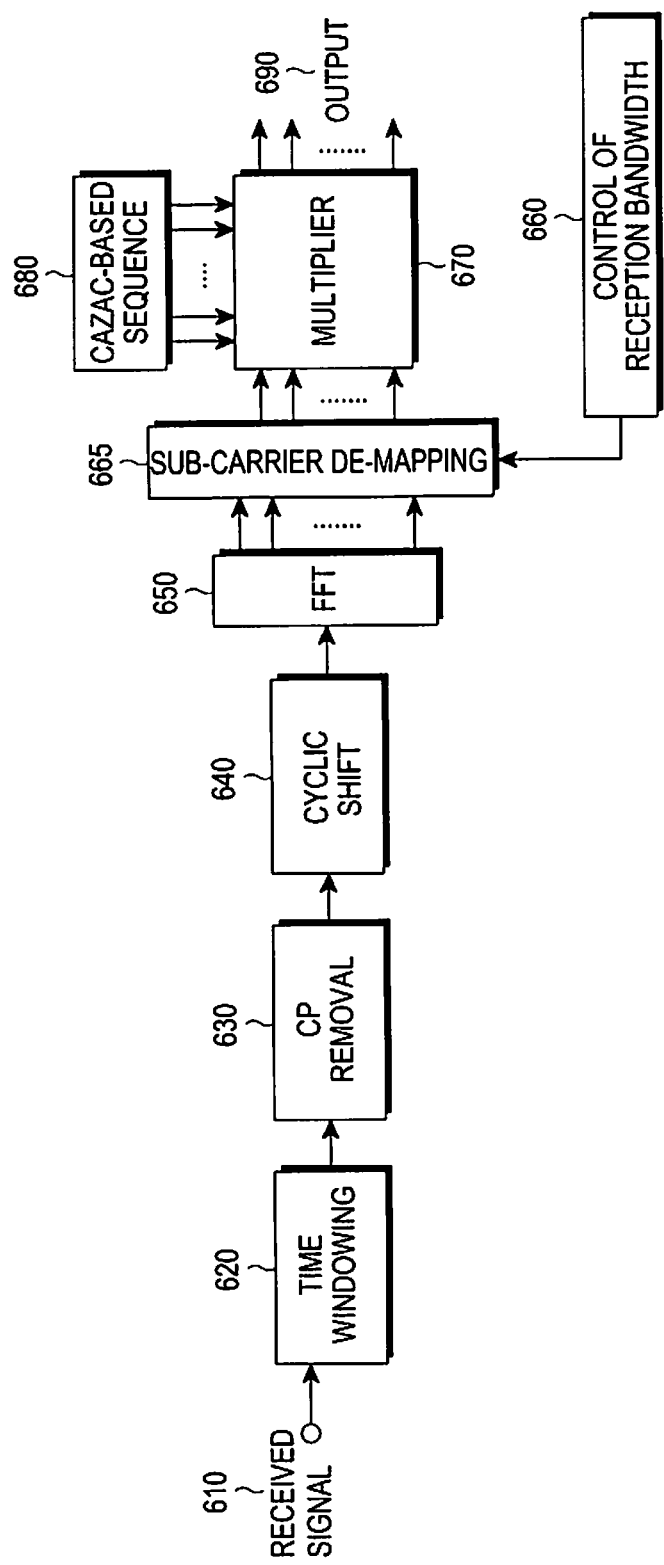
FIG. 6 is a block diagram illustrating a conventional RS reception process.
Figure 7:
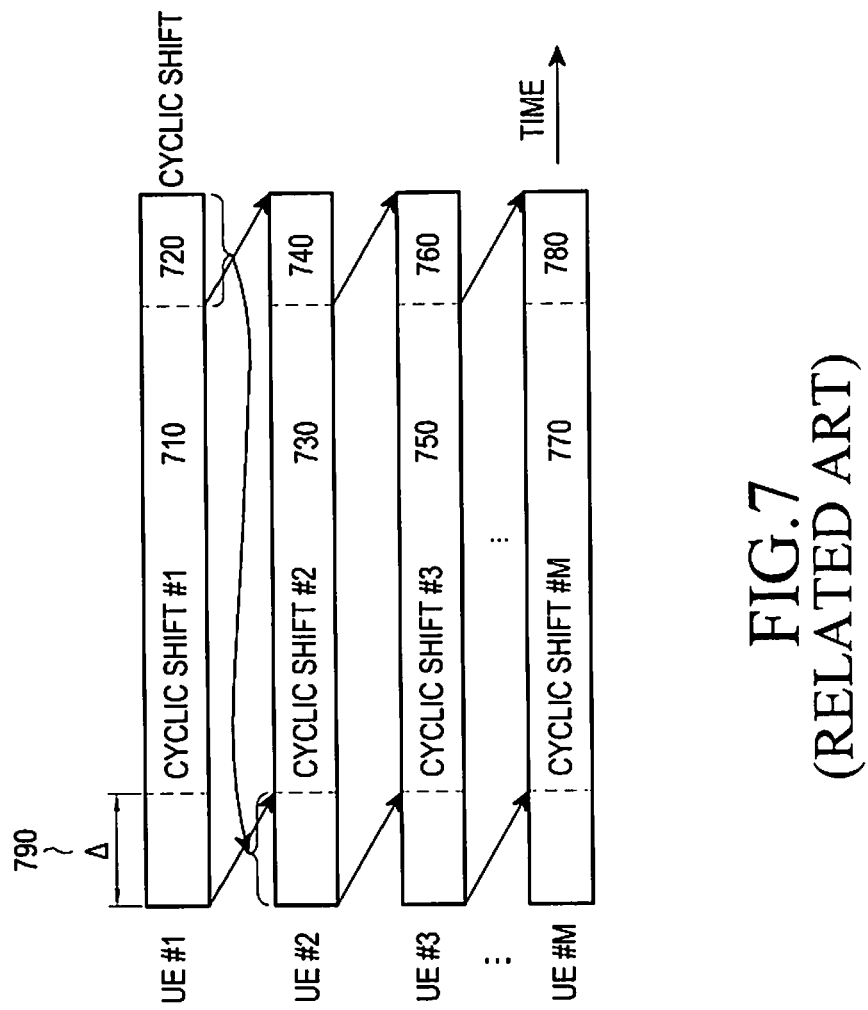
FIG. 7 is a diagram illustrating conventional orthogonal RS multiplexing using different cyclic shifts of a CAZAC sequence.
Figure 8:
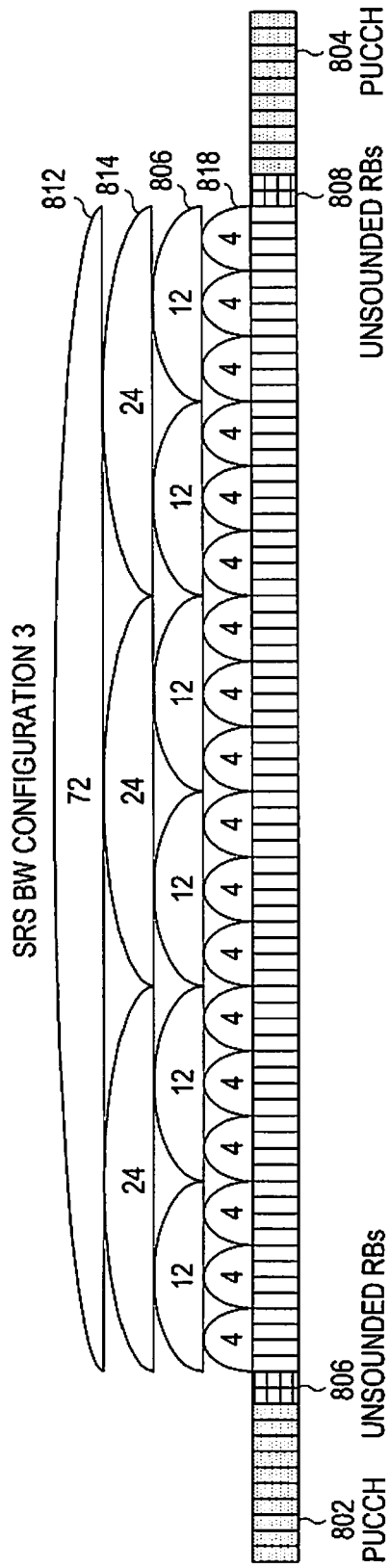
FIG. 8 is a diagram illustrating conventional multiplexing of SRS transmissions in various bandwidths.
Figure 9:
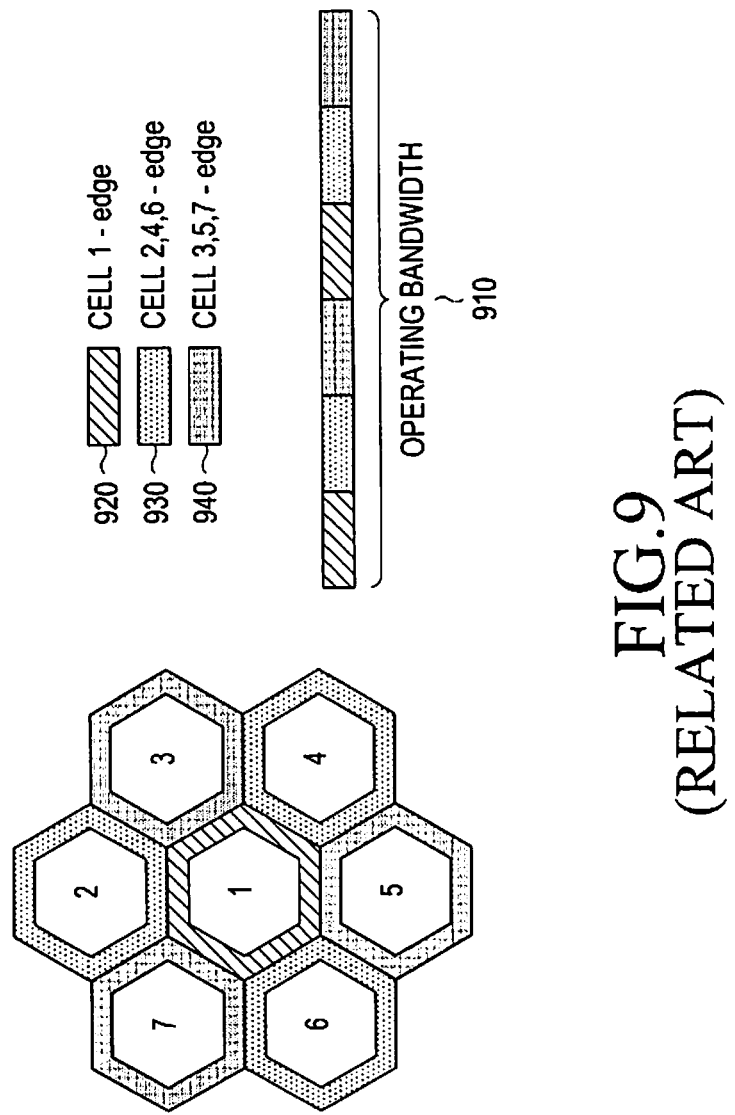
FIG. 9 is a diagram illustrating a conventional application of frequency-domain ICIC.
Figure 10:
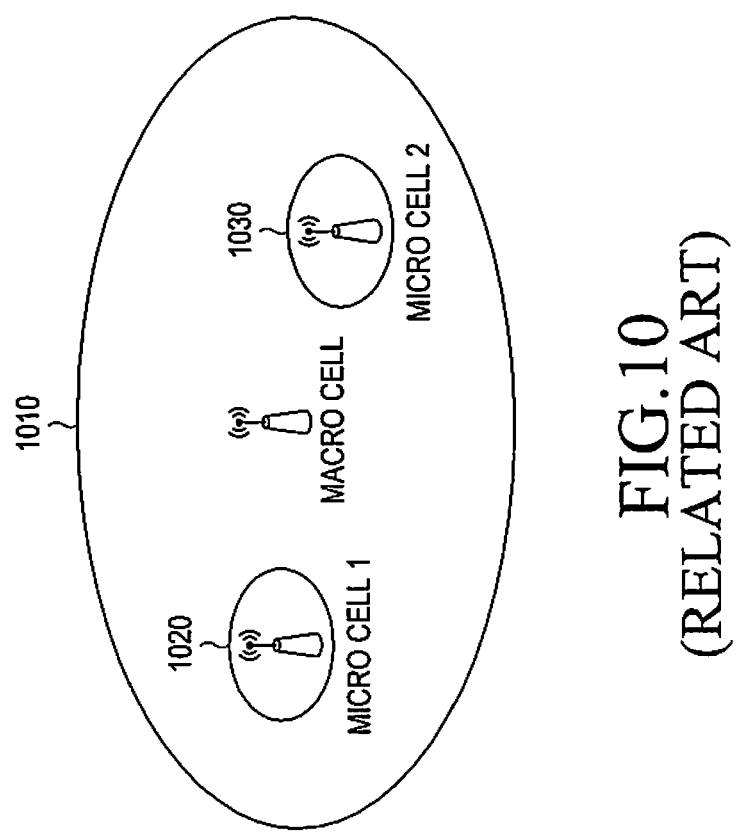
FIG. 10 is a diagram illustrating a conventional heterogeneous network.

Various embodiments of the present invention will be described below in more detail with reference to the accompanying drawings. The present invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the embodiments of the present invention are described below in relation to an Orthogonal Frequency Division Multiple Access (OFDMA) communication system, the present invention is also applicable to all Frequency Division Multiplexing (FDM) systems in general and to Single-Carrier Frequency Division Multiple Access (SC-FDMA), OFDM, FDMA, Discrete Fourier Transform (DFT)-spread OFDM, DFT-spread OFDMA, SC-OFDMA, and SC-OFDM.

The various embodiments of the present invention described below are directed to enhancing features of UL RS transmissions by enabling signaling to support orthogonal DMRS multiplexing in the PUSCH among UEs using different OCCs in the time domain while optimizing the combined use of CS and OCCs for orthogonal DMRS multiplexing, enabling SRS BW hopping over parts of a maximum SRS BW, and enabling simultaneous SRS transmissions from a UE over non-contiguous parts of an operating BW.

In accordance with an embodiment of the present invention, a CSI IE in a UL SA is used to provide signaling support for orthogonal DMRS multiplexing among UEs in a time domain by indicating a respective OCC, in addition to a CS. Accordingly, the CSI IE is hereafter referred to as an RS Configuration (RSC) IE. Additionally, the UL SA remains unchanged and no additional IE is introduced to indicate the OCC for the DMRS transmission by a UE. Instead, the RSC IE provides mapping to both the CS value and the OCC for UEs supporting the application of OCC for their DMRS transmission.

Basically, in accordance with an embodiment of the present invention, mappings are provided that satisfy certain design criteria that maximize orthogonal separation among DMRS or optimize a multiplexing capacity of orthogonal DMRS.

A CSI IE consists of, for example, 3 bits and addresses a CS from a set of eight CSs, $\{CS_0, CS_1, CS_2, CS_3, CS_4, CS_5, CS_6, CS_7\}$, wherein the CS values are listed in an ascending order. For example, for frequency domain generation of a CAZAC-based sequence $\bar{r}(n)$, with n denoting an RE index, a DMRS sequence is $r^{(\alpha)(n)=e^{j\alpha n}}\bar{r}(n)$, where $\alpha$ is a CS given as $\alpha = 2\pi n_{CS}/12$, where $n_{CS} = (N_{DMRS} + n_{DMRS})$ mod 12 with $N_{DMRS}$ being common to all UEs in the same cell and $n_{DMRS}$ is determined from the 3 bits of the CSI IE in the UL SA based on the mapping shown in Table 3 below.

TABLE 3

Mapping of CSI IE to $n_{DMRS}$.

| CS | CSI IE Value | $n_{DMRS}$ |
|---|---|---|
| $CS_0$ | 000 | 0 |
| $CS_1$ | 001 | 6 |
| $CS_2$ | 010 | 3 |
| $CS_3$ | 011 | 4 |
| $CS_4$ | 100 | 2 |
| $CS_5$ | 101 | 8 |
| $CS_6$ | 110 | 10 |
| $CS_7$ | 111 | 9 |

Selecting CS values having a largest mutual distance in a time domain (modulo 12), optimal CS values for 2 MU-MIMO UEs are $CS_0$ and $CS_1$, optimal CS values for 3 MU-MIMO UEs are $CS_0$, $CS_3$ and $CS_5$, and optimal CS values for 4 MU-MIMO UEs are $CS_0$, $CS_1$, $CS_2$ and $CS_7$. For more than 4 MU-MIMO UEs, the optimal CS values practically consist of the first 4 ones[$\leftarrow CS_0$, $CS_1$, $CS_2$ and $CS_7$?=>O.K] and any other additional values.

Additionally, for 2 DMRS per sub-frame, the possible OCCs are $\{1, 1\}$ and $\{1, -1\}$. It is noted that UEs that do not support time domain OCC for the DMRS (legacy UEs) have an implicit assignment of the OCC $\{1, 1\}$. To avoid loss of orthogonality due to temporal channel variation, a different set of CS values should be assigned for the 2 OCCs. As the communication system is assumed to support legacy UEs that implicitly use OCC $\{1, 1\}$, and as OCC $\{1, -1\}$ should not use the same CS values as OCC $\{1, 1\}$, the first 4 CS values with maximum mutual distance should be linked to OCC $\{1, 1\}$. Table 4 presents an example of mapping RSC IE values to combinations of CS values and the OCC based on the above-described design considerations.

TABLE 4

Mapping of RSC IE to $n_{DMRS}$ and OCCs.

| CS | RSC IE Value | $n_{DMRS}$ | OCC |
|---|---|---|---|
| $CS_0$ | 000 | 0 | $\{1, 1\}$ |
| $CS_1$ | 001 | 6 | $\{1, 1\}$ |
| $CS_2$ | 010 | 3 | $\{1, 1\}$ |
| $CS_3$ | 011 | 4 | $\{1, -1\}$ |
| $CS_4$ | 100 | 2 | $\{1, -1\}$ |
| $CS_5$ | 101 | 8 | $\{1, -1\}$ |
| $CS_6$ | 110 | 10 | $\{1, -1\}$ |
| $CS_7$ | 111 | 9 | $\{1, 1\}$ |

As seen in Table 4, while the CS values associated with the OCC $\{1, 1\}$ have maximum mutual distance, CS values associated with the OCC $\{1, -1\}$ do not. A mapping that achieves this objective for the OCC $\{1, -1\}$ is presented in Table 5 below.

TABLE 5

Mapping of RSC IE to $n_{DMRS}$ and OCCs.

| CS | RSC IE Value | $n_{DMRS}$ | OCC |
|---|---|---|---|
| $CS_0$ | 000 | 0 | $\{1, 1\}$ |
| $CS_1$ | 001 | 6 | $\{1, 1\}$ |
| $CS_2$ | 010 | 3 | $\{1, 1\}$ |
| $CS_3$ | 011 | 5 | $\{1, -1\}$ |
| $CS_4$ | 100 | 2 | $\{1, -1\}$ |
| $CS_5$ | 101 | 8 | $\{1, -1\}$ |
| $CS_6$ | 110 | 11 | $\{1, -1\}$ |
| $CS_7$ | 111 | 9 | $\{1, 1\}$ |

Maximum CS distance for OCC $\{1, -1\}$.

To maximize the number of MU-MIMO UEs that use the mapping in Table 3, while supporting a mixture of legacy UEs, and UEs that apply OCCs to their DMRS transmissions, the mapping of the RSC IE to CS values and OCCs for the latter UEs can be performed as shown in Table 6, where the OCC $\{1, 1\}$ uses CS values that are not used by legacy UEs. Accordingly, for OCC $\{1, 1\}$, the CS values not used by legacy UEs are used by UEs that apply OCCs to their DMRS transmission and CS values used by both types of UEs are combined with the OCC $\{1, -1\}$ for UEs that apply OCCs to their DMRS transmission. This mapping maximizes the number of supportable MU-MIMO UEs while maintaining mutual DMRS orthogonality.

TABLE 6

Mapping of RSC IE Values to $n_{DMRS}$ and OCCs to maximize MU-MIMO capacity.

| CS | RSC IE Value | $n_{DMRS}$ | OCC |
|---|---|---|---|
| $CS_0$ | 000 | 0 | {1, −1} |
| $CS_1$ | 001 | 6 | {1, −1} |
| $CS_2$ | 010 | 3 | {1, −1} |
| $CS_3$ | 011 | 1 | {1, 1} |
| $CS_4$ | 100 | 5 | {1, 1} |
| $CS_5$ | 101 | 7 | {1, 1} |
| $CS_6$ | 110 | 11 | {1, 1} |
| $CS_7$ | 111 | 9 | {1, −1} |

In accordance with another embodiment of the invention, SRS hopping is enabled in parts of a maximum configured SRS transmission BW $m_{SRS,0}$ (in RBs), or in parts of a UL operating BW. A UE can be configured by the Node B whether to perform SRS BW hopping. Additionally, although a single UE transmitter antenna is described herein, for multiple UE transmitter antennas, the same concepts can apply for each individual antenna.

Figure 11:
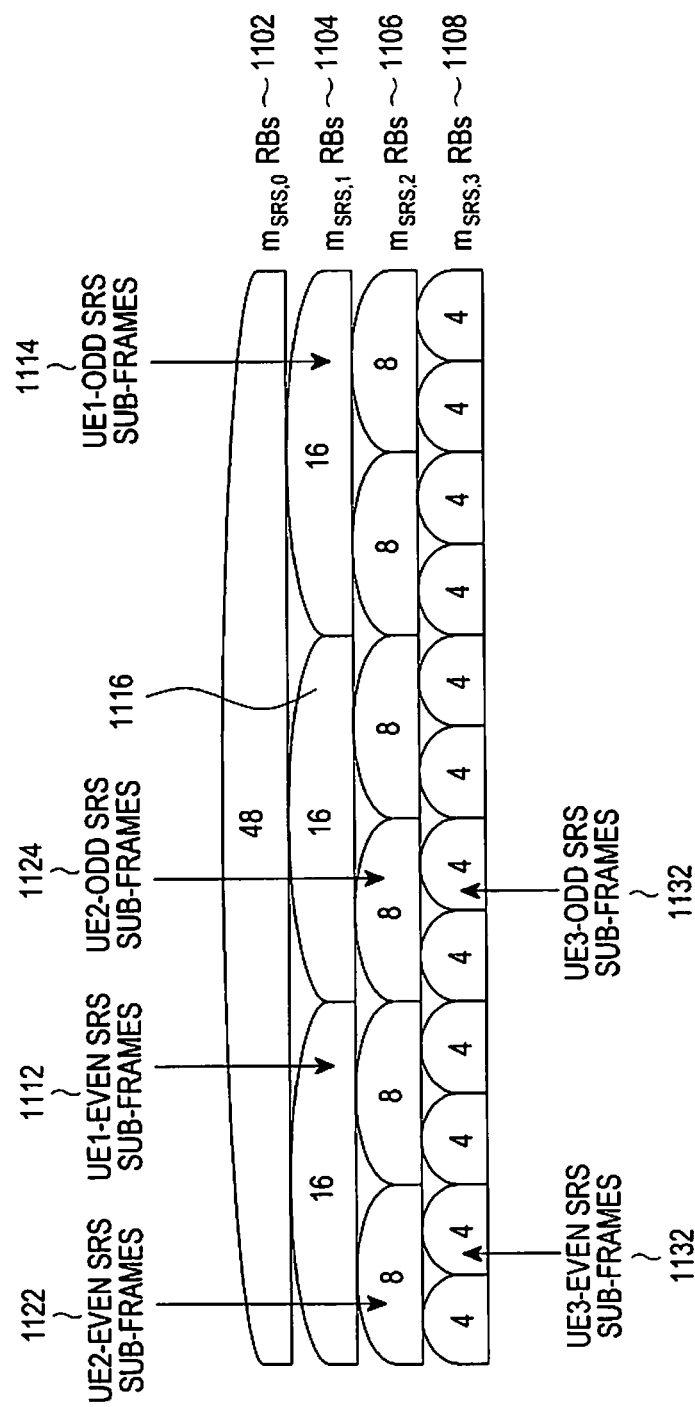
FIG. 11 is a diagram illustrating a restriction of SRS hopping in parts of a maximum configured SRS BW, according to an embodiment of the present invention.

FIG. 11 is a diagram illustrating a restriction of SRS hopping in parts of a maximum configured SRS BW, according to an embodiment of the present invention. Generalizations will be subsequently discussed and the restriction may apply only in a sub-set of TTIs. For clarity, only the SRS transmission from 3 UEs is depicted.

Referring to FIG. 11, the maximum SRS transmission BW for a particular SRS configuration is $m_{SRS,0}$=48 RBs 1102 and the remaining SRS transmission BWs are $m_{SRS,1}$=16 RBs 1104, $m_{SRS,2}$=8 RBs 1106, and $m_{SRS,3}$=4 RBs 1108. UE1 is restricted to transmit an SRS in the first $m_{SRS,1}$=16 RBs during its odd-numbered SRS sub-frames 1112 and in the third $m_{SRS,1}$=16 RBs during its even-numbered SRS sub-frames 1114. UE2 is restricted to transmit an SRS in the first $m_{SRS,2}$=8 RBs during its odd-numbered SRS sub-frames 1122 and in the third $m_{SRS,2}$=8 RBs during its even-numbered SRS sub-frames 1124. Further, UE3 is restricted to transmit an SRS in the second $m_{SRS,3}$=4 RBs during its odd-numbered SRS sub-frames 1132 and in the sixth $m_{SRS,3}$=4 RBs during its even-numbered SRS transmission sub-frames 1134.

Conventional SRS hopping patterns include a simple serial pattern, where SRS transmissions from a UE sweep consecutively in frequency through the maximum configured SRS BW of $m_{SRS,0}$ RBs in $m_{SRS,0}/m_{SRS,b}$ steps of $m_{SRS,b}$ RBs during respective SRS transmission sub-frames, and also include patterns enhancing the frequency diversity where successive SRS transmissions are in non-consecutive BWs of $m_{SRS,b}$ RBs. The frequency location of the first SRS transmission with BW of $m_{SRS,b}$ RBs, $n_{b,0}$ is informed to the UE through RRC signaling by the Node B. The number of distinct SRS transmissions before the SRS transmission returns to its initial frequency location is $m_{SRS,0}/m_{SRS,b}$.

However, as conventional SRS hopping patterns are not appropriate for operation with ICIC and in heterogeneous networks, in accordance with an embodiment of the present invention, hopping of SRS transmissions with BW smaller than the maximum configured BW of $m_{SRS,0}$ RBs is enabled only in parts of $m_{SRS,0}$ RBs. For a serial SRS hopping pattern, this is achieved by barring the SRS transmission with BW of $m_{SRS,b}$ RBs from some BWs of $m_{SRS,b}$ RBs Within the maximum configured BW of $m_{SRS,0}$ RBs.

For example, in FIG. 11, UE1 performs the first SRS transmission in the first $m_{SRS,1}$=16 RBs 1112 (the numbering of SRS transmissions starts from 0), skips the second $m_{SRS,1}$=16 RBs 1116, performs the second SRS transmission in the third $m_{SRS,1}$=16 RBs 1114, and continues SRS transmissions in the same manner by performing the third SRS transmission in the first $m_{SRS,1}$=16 RBs 1112.

The indexing of the BWs of $m_{SRS,b}$ RBs where a UE can perform SRS transmissions is provided to the UE by the Node B through RRC signaling. For example, using a bitmap, the BWs of $m_{SRS,1}$=16 RBs where UE1 can perform SRS transmissions in FIG. 11 can be indicated as {1, 0, 1}. However, additional signaling to provide the indexing may not be needed if the UE can implicitly determine the BWs for SRS transmission from other information provided by the Node B, such as, for example, information related to the application of ICIC.

The SRS frequency position $n_b$ after $n_{SRS}$ SRS transmissions, starting from $n_{SRS}$=0, may be determined using Equations (2) and (3) below.

$$n_b = (F_b(n_{SRS}) + n_{b,0}) \mod N_b \quad (2)$$

In Equation (2), $N_0 = m_{SRS,b-1}/m_{SRS,b}$, b>0.

$$F_b(n_{SRS}) = \quad (3)$$

$$\begin{cases} (N_b/2) \left\lfloor \dfrac{n_{SRS} \mod \prod_{b'=b_{hop}}^{b} N_{b'}}{\prod_{b'=b_{hop}}^{b-1} N_{b'}} \right\rfloor + \left\lfloor \dfrac{n_{SRS} \mod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} \Big/ \prod_{b'=b_{hop}}^{b-1} N_{b'} \right\rfloor & \text{if } N_b \text{ odd} \end{cases}$$

In Equation (3), $b_{hop} \in (0, 1, 2, 3)$ and $N_{b_{hop}} = 1$.

When a UE is restricted from performing SRS transmission from certain BWs of $m_{SRS,b}$ RBs, SRS transmissions in those BWs can be skipped and the UE can instead transmit at a next BW specified by the above pattern. This scenario is illustrated in FIG. 12 where, using the above hopping pattern, an SRS transmission of $m_{SRS,b}$=4 RBs is shown without restrictions in the SRS transmission BW and with restrictions in the SRS transmission BW.

Figure 12:
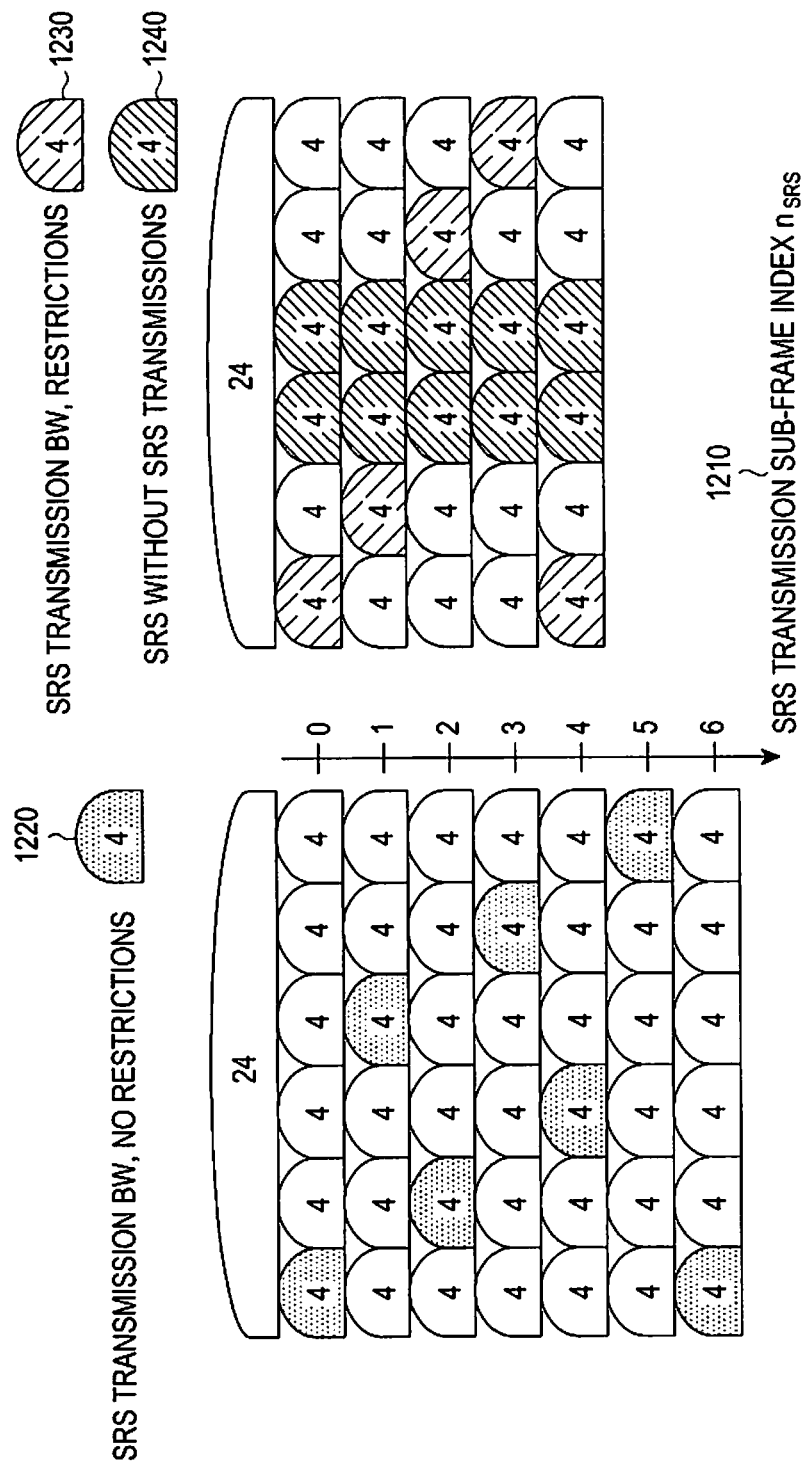
FIG. 12 is a diagram illustrating SRS transmissions over a restricted BW, which is smaller than a maximum SRS transmission BW, based on a first hopping pattern used for SRS transmissions over the maximum SRS transmission BW, according to an embodiment of the present invention.

FIG. 12 is a diagram illustrating SRS transmissions over a restricted BW, which is smaller than a maximum SRS transmission BW, based on a first hopping pattern used for SRS transmissions over the maximum SRS transmission BW, according to an embodiment of the present invention.

Referring to FIG. 12, $m_{SRS,0} = 24$ RBs, $m_{SRS,1} = 4$ RBs, and $b_{hop} = 0$.

Then, for $m_{SRS,1} = 4$

RBs SRS BW, $N_1 = 6$ and $$F_b(n_{SRS}) =$$

$$(N_b/2) \cdot \left\lfloor \dfrac{n_{SRS} \mod \prod_{b'=b_{hop}}^{b} N_{b'}}{\prod_{b'=b_{hop}}^{b-1} N_{b'}} \right\rfloor + \left\lfloor \dfrac{n_{SRS} \mod \prod_{b'=b_{hop}}^{b} N_{b'}}{2 \prod_{b'=b_{hop}}^{b-1} N_{b'}} \right\rfloor =$$

$$(N_1/2) \cdot (n_{SRS} \mod N_1) + \left\lfloor \dfrac{n_{SRS} \mod N_1}{2} \right\rfloor = 3 \cdot (n_{SRS} \mod 6) + \left\lfloor \dfrac{n_{SRS} \mod 6}{2} \right\rfloor.$$

In FIG. 12, the SRS transmission BW in different SRS transmission sub-frames 1210 is illustrated without restrictions 1220 and with restrictions 1230, where the SRS is barred from being transmitted in certain BWs 1240.

The advantage of the previous SRS hopping method with BW restrictions is that it re-uses applicable hopping patterns without restrictions in the SRS BW location with the restriction that if the SRS transmission is to occur in a barred BW location, instead, it occurs in the next allowable BW determined according to the hopping pattern. However, when there are restrictions, as the total SRS transmission BW is a subset of the total SRS transmission BW with restrictions, the frequency diversity optimality of the SRS hopping pattern without BW restrictions is not maintained using BW restrictions for the SRS transmission.

An alternative method for defining an SRS hopping pattern is described below, in accordance with another embodiment of the present invention, wherein some parts of the maximum configured BW of $m_{SRS,0}$ RBs are restricted from having SRS transmissions with smaller BW of $m_{SRS,b}$ RBs, b>0, from a reference UE. A new maximum SRS BW, $m_{SRS,0}^r = N_b^r m_{SRS,b}$, is defined with $N_b^r$ denoting the number of BWs of size $m_{SRS,b}$ where the SRS transmission can hop, $N_b^r < m_{SRS,0}/m_{SRS,b}$, and $N_b$ is substituted by $N_b^r$. This modification is only for the formula to determine the SRS hopping pattern, while the remaining BW indexing remains the same as previously described. Then, at least for b=1, $F_b^r(n_{SRS})$ can be determined using Equation (4).

$$F_b^r(n_{SRS}) = \begin{cases} (N_b^r/2) \cdot (n_{SRS} \bmod N_b^r) + \left\lfloor \dfrac{n_{SRS} \bmod N_b^r}{2} \right\rfloor & \text{if } N_b^r \text{ even} \\ \lfloor N_b^r/2 \rfloor \cdot n_{SRS} & \text{if } N_b^r \text{ odd} \end{cases} \quad (4)$$

Figure 13:
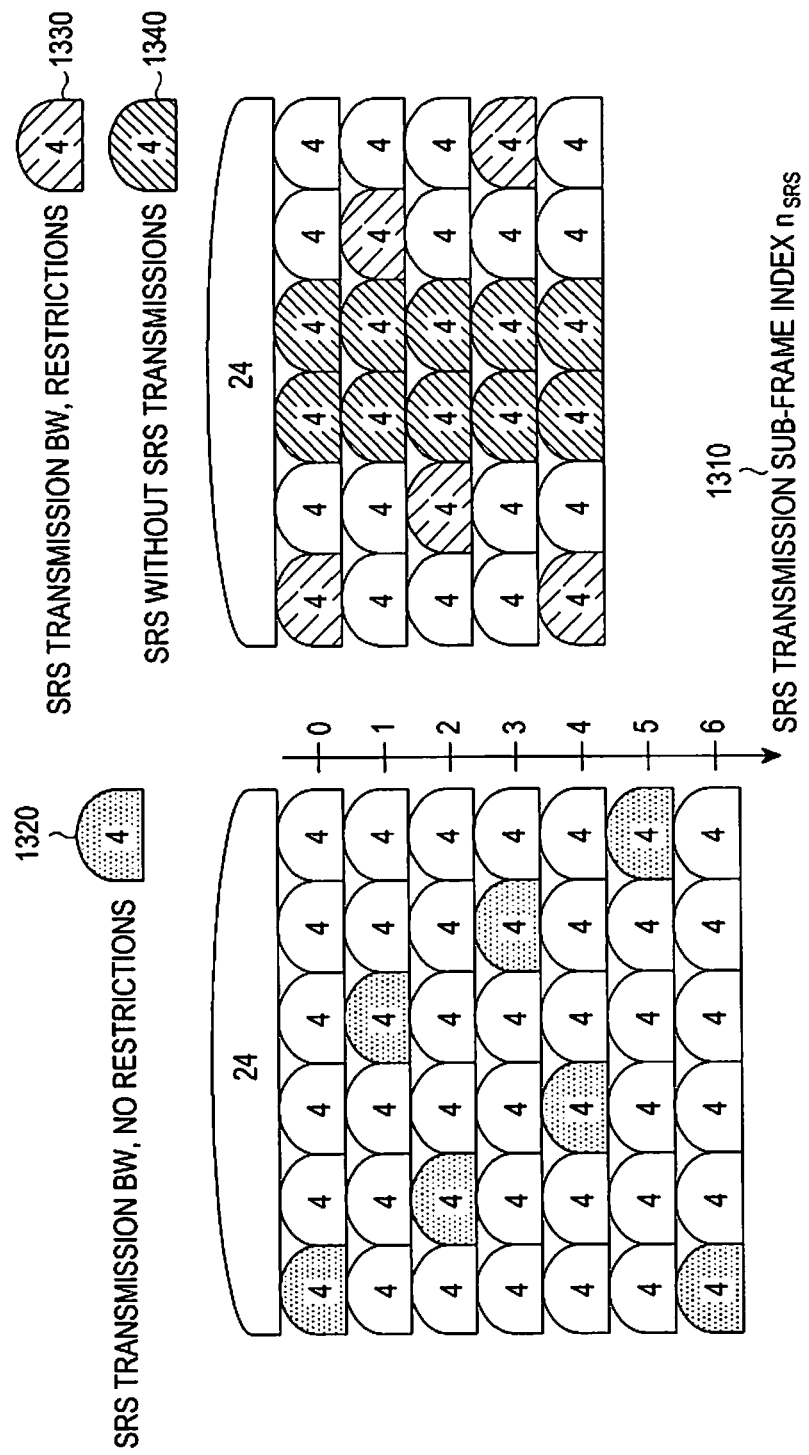
FIG. 13 is a diagram illustrating SRS transmissions over a restricted BW, which is smaller than a maximum SRS transmission BW, based on a second hopping pattern achieving maximum separation in frequency between successive SRS transmissions, according to an embodiment of the present invention.

The respective hopping pattern is illustrated in FIG. 13 for the same parameters as in FIG. 12.

For $m_{SRS,1}=4$ RBs SRS BW, $N_1^r=4$ and $F_b(n_{SRS})$ can be determined using Equation (5).

$$F_b(n_{SRS}) = (N_b^r/2) \cdot (n_{SRS} \bmod N_b^r) + \left\lfloor \dfrac{n_{SRS} \bmod N_b^r}{2} \right\rfloor = \quad (5)$$

$$2 \cdot (n_{SRS} \bmod 4) + \left\lfloor \dfrac{n_{SRS} \bmod 4}{2} \right\rfloor$$

FIG. 13 is a diagram illustrating SRS transmissions over a restricted BW, which is smaller than a maximum SRS transmission BW, based on a second hopping pattern achieving maximum separation in frequency between successive SRS transmissions, according to an embodiment of the present invention.

Referring to FIG. 13, the SRS transmission BW in different SRS transmission sub-frames 1310 is illustrated without restrictions 1320 and with restrictions 1330 where the SRS is barred from being transmitted in certain BWs 1340. As described above, the Node B is assumed to inform the UE through RRC signaling whether the UE should use the modified hopping pattern and of the associated parameters.

In accordance with another embodiment of the present invention, an SRS transmission is provided for supporting PUSCH scheduling in non-contiguous parts of the UL operating BW. Again, the description below is provided with reference to a single UE transmitter antenna. However, for multiple UE transmitter antennas, the same concepts can apply for each individual antenna.

Simultaneous SRS transmission BWs of $m_{SRS,b}$ RBs, b>0, can be indicated in a similar manner as the BW parts of the maximum SRS BW of $m_{SRS,0}$ RBs, where an SRS transmission is permitted or barred, as was previously described. For example, the Node B using a bitmap of $N < m_{SRS,0}/m_{SRS,b}$ bits, can indicate to the UE to simultaneously perform SRS transmission in a number of BWs of $m_{SRS,b}$ RBs, b>0.

For example, if $m_{SRS,0}/m_{SRS,b}=8$ and the bitmap is {0, 1, 0, 0, 0, 0, 1, 0}, the UE performs simultaneous SRS transmission in the second and seventh SRS BWs of $m_{SRS,b}$ RBs, b>0. Alternatively, a UE configured to perform M simultaneous SRS transmissions may use the same BWs as the BWs corresponding to M SRS transmissions in M consecutive SRS transmission sub-frames for the UE using the respective SRS hopping pattern.

For example, for M=2, a UE with SRS hopping pattern in BWs {BW$_1$, BW$_1$, BW$_2$, BW$_b$, BW$_3$, BW$_6$, BW$_1$, . . . }, as illustrated in the left side of FIG. 12 or FIG. 13, during respective consecutive SRS transmission sub-frames for the UE, can have two simultaneous SRS transmissions during a first SRS transmission sub-frame in {BW$_1$,BW$_4$}, two simultaneous SRS transmissions during a second SRS transmission sub-frame in {BW$_2$, BK$_b$}, two simultaneous SRS transmissions during a third SRS transmission sub-frame in {BW$_3$, BW$_6$}, two simultaneous SRS transmissions during a fourth SRS transmission sub-frame in {BW$_1$,BW$_4$}, etc. In this manner, the benefits of the SRS hopping pattern are preserved without requiring additional signaling, for example, through a bit-map.

Indexing with a fewer number of bits than required by a bit-map can be developed with some restrictions in the number or in the positions of simultaneous SRS transmissions that have the same BW. For example, if a UE is configured to simultaneously perform 2 SRS transmissions of $m_{SRS,b}$ RBs, b>0, with the BW position of the first SRS transmission being in the first half of $m_{SRS,0}$ RBs and using the same BW position for the second SRS transmission but in the second half of $m_{SRS,0}$ RBs, then the number of bits can be reduced by half relative to the one required using a bitmap. Variations of the indexing method can directly apply. For example, the BW positions of two simultaneous SRS transmissions can be symmetric from each end of the maximum configured SRS BW of $m_{SRS,0}$ RBs (instead of being in the same position in the first and second half of $m_{SRS,0}$).

Additionally, potential BW positions for smaller SRS BWs can be grouped so that the same number of bits is used for indexing regardless of the SRS BW. For example, considering a first SRS transmission of $m_{SRS,b1}$ RBs and a second SRS transmission of $m_{SRS,b2}$ RBs, where $m_{SRS,b2}/m_{SRS,b1}=F>1$, the BW position of the first SRS transmission can only be indicated to be within F blocks of $m_{SRS,b1}$ RBs with the actual block being always a predetermined one, such as the first or the middle one, or implicitly determined, for example based on the UE ID or other parameters assigned to the SRS transmission such as the CS, the comb, etc. For example, for a maximum SRS transmission BW of $4m_{SRS,b2}$ RBs and $m_{SRS,b2}/m_{SRS,b1}=F=2$ a bit-map with 4 bits can indicate the possible positions for the SRS transmission with BW of $m_{SRS,b2}$ RBs. One of these positions is for SRS transmission BW of $m_{SRS,b1}$ RBs, but as two such positions exist within $m_{SRS,b2}$ RBs (starting at the first RB or starting after $m_{SRS,b1}$ RBs), the UE may be configured, for example, to always use the first position.

With the exception of the multiple BWs for simultaneous SRS transmission of $m_{SRS,b}$ RBs, b>0, which are separately configured for each UE, the Node B may configure for each UE a single set for the remaining SRS transmission parameters that are applicable to all sub-BWs, including a single CS, a single comb, a single SRS transmission period, and a single SRS starting transmission sub-frame.

A single CS

The SRS CS may be the same in all multiple BWs or it may vary according to a predetermined manner across the multiple BWs of $m_{SRS,b}$ RBs, b>0. Having a variable CS is beneficial for statistically minimizing the increase in the cubic metric that is associated with the transmission of multiple SRS when they happen to have the same BW of $m_{SRS,b}$ RBs, b>0.

For example, assuming 8 possible CS values $\{CS_0, CS_1, CS_2, CS_3, CS_4, CS_5, CS_6, CS_7\}$ and that a UE is assigned $CS_0$ as the SRS CS for transmission in the first BW of $m_{SRS,b}$ RBs, b>0, if the UE is also assigned 2 more BWs of $m_{SRS,b}$ RBs, b>0, the SRS CS in those BWs can simply be the next CS, $CS_1$, and $CS_2$, or they can be the CS with the largest mutual separation, $CS_3$ and $CS_6$.

A Single Comb

The SRS comb may be the same in all multiple BWs of $m_{SRS,b}$ RBs, b>0, or it may vary according to a predetermined manner across these BWs.

For example, a pseudo-random pattern may be applied to the SRS comb determination in the variable BWs to randomize the interference experienced on a particular comb.

A Single SRS Transmission Period

A single SRS transmission period applicable to all multiple BWs of $m_{SRS,b}$ RBs, b>0.

A Single SRS Starting Transmission Sub-Frame

A single SRS starting transmission sub-frame applicable to all multiple BWs of $m_{SRS,b}$ RBs, b>0.

SRS hopping is enabled or not for all multiple BWs of $m_{SRS,b}$ RBs, b>0. Alternatively, SRS hopping may be enabled for a subset of the multiple SRS transmissions.

For example, one SRS transmission may always occur at a fixed BW and another SRS transmission may be hopping among multiple BWs. In this manner, the Node B can obtain the UL channel medium information at the fixed BW for UE scheduling in that BW while it can also obtain the UL channel medium information in other multiple BWs and, based on that information, switch the UE scheduling from the fixed BW in one of the multiple BWs and then make that BW the new fixed BW.

Figure 14:
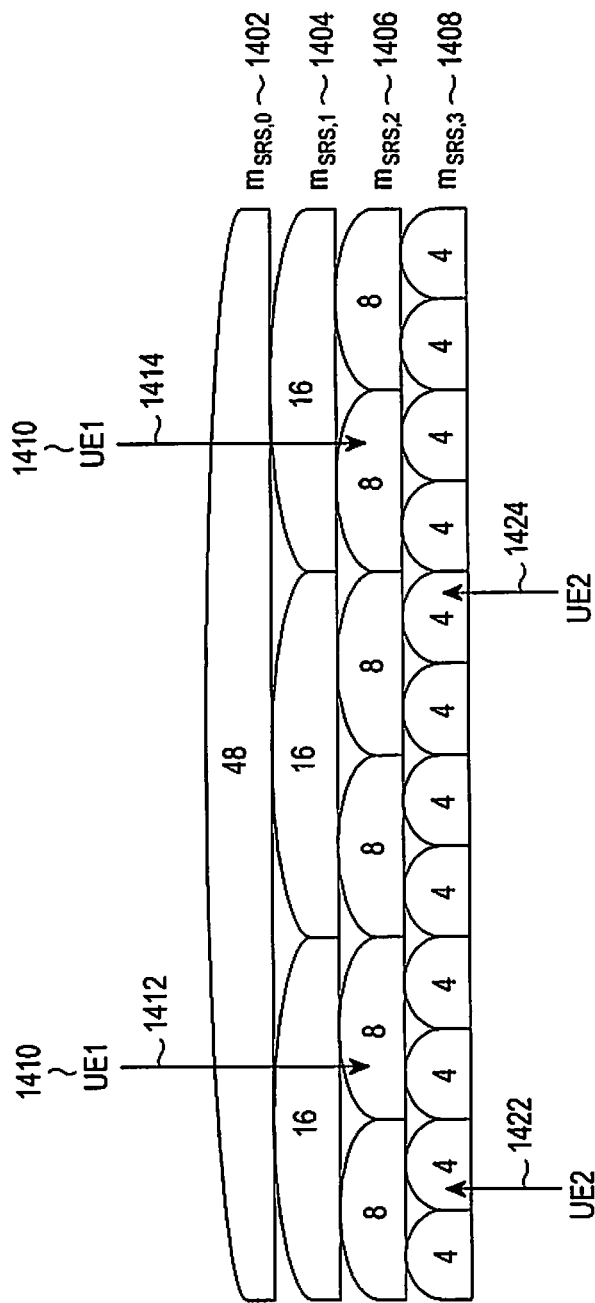
FIG. 14 is a diagram illustrating simultaneous SRS transmissions in multiple BWs according to an embodiment of the present invention.

FIG. 14 is a diagram illustrating simultaneous SRS transmissions in multiple BWs according to an embodiment of the present invention. Specifically, FIG. 14 illustrates the simultaneous SRS transmission in multiple BWs of $m_{SRS,b}$ RBs, b>0, within the maximum configured SRS BW of $m_{SRS,0}$ RBs. For ease of description, only SRS transmissions from 2 UEs are depicted.

Referring to FIG. 14, the maximum SRS transmission BW is $m_{SRS,0}$=48 RBs 1402 and the remaining SRS transmission BWs are $m_{SRS,1}$=16 RBs 1404, $m_{SRS,2}$=8 RBs 1406, and $m_{SRS,3}$=4 RBs 1408. UE1 1410 has two simultaneous SRS transmissions 1412 and 1414, both with the same BW $m_{SRS,2}$, which are respectively located at the same position in the first half and in the second half of $m_{SRS,0}$ RBs. UE2 1420 has two simultaneous SRS transmissions 1422 and 1424, again, both with the same BW $m_{SRS,3}$, which are symmetrically located relative to each side of $m_{SRS,0}$ RBs.

Figure 15:
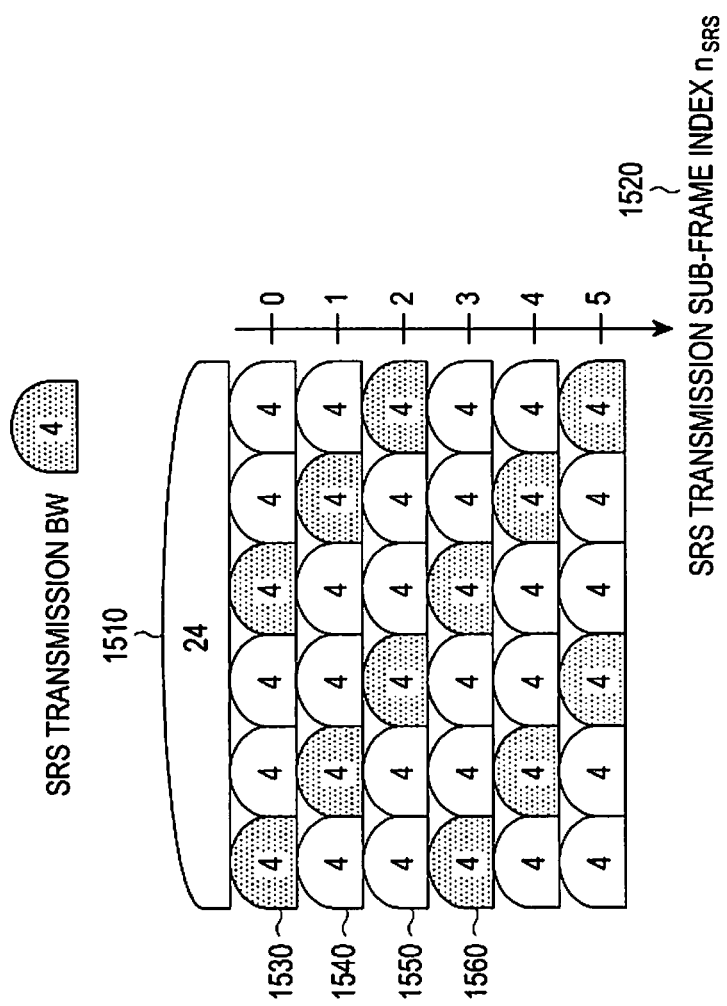
FIG. 15 is a diagram illustrating simultaneous SRS transmissions in two BWs, which are determined according to an SRS hopping pattern, according to an embodiment of the present invention.

FIG. 15 is a diagram illustrating simultaneous SRS transmissions in two BWs, which are determined according to an SRS hopping pattern, according to an embodiment of the present invention. Specifically, FIG. 15 illustrates the simultaneous SRS transmission in M=2 BWs, having 4 RBs, which are determined using the SRS hopping pattern.

Referring to FIG. 15, in a total SRS transmission BW of 24 RBs 1510, the SRS transmission during a first SRS transmission sub-frame 1520 is in the first and fourth BWs 1530, the SRS transmission during a second SRS transmission sub-frame is in the second and fifth BWs 1540, the SRS transmission during a third SRS transmission sub-frame is in the third and sixth BWs 1550, the SRS transmission during a fourth SRS transmission sub-frame is in the first and fourth BWs 1560, etc.

Figure 16:
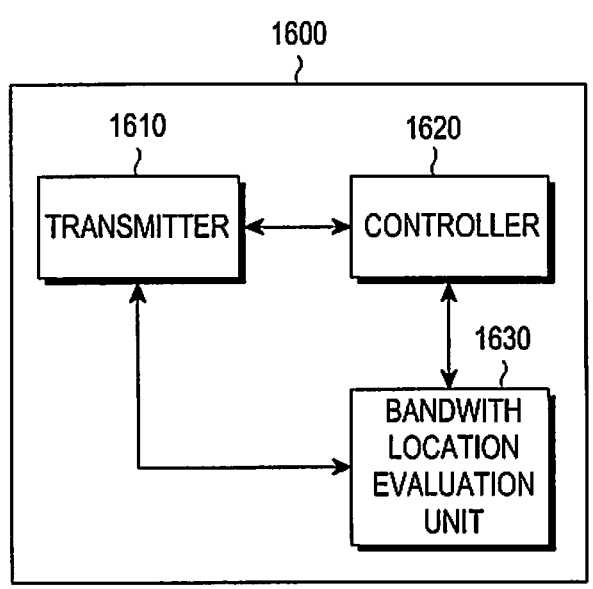
FIG. 16 is a block diagram illustrating a structure of a reception apparatus according to the present invention.

FIG. 16 is a block diagram illustrating an exemplary structure of a reception apparatus, according to an embodiment of the present invention. The reception apparatus 1600 includes, for example, a transmitter 1610, a controller 1620.

The transmitter 1610 transmits an RS with a first bandwidth size and in a first bandwidth location in a first set of sub-frames, and transmits an RS with a second bandwidth size and in a second bandwidth location during a second set of sub-frames, wherein the second bandwidth size is smaller than the predefined maximum RS bandwidth size.

Also, the transmitter 1610 transmits an RS according to a first bandwidth hopping pattern spanning the first bandwidth, and transmits an RS according to a second bandwidth hopping pattern spanning a second bandwidth, The first bandwidth is larger than the second bandwidth and includes at least a portion of the second bandwidth.

Also, the transmitter 1610 transmits an RS in a first mode over a contiguous bandwidth, and transmits an RS in a second mode at multiple non-contiguous bandwidth locations.

The reception apparatus further includes a bandwidth location evaluation unit.

The bandwidth location evaluation unit 1630 determines a number of RS bandwidth locations according to a bandwidth location hopping pattern, starting from a predetermined bandwidth location for an initial RS transmission or from a next bandwidth location determined according to a hopping pattern relative to a bandwidth location of a last RS transmission, until a bandwidth location that belongs in the set of bandwidth locations is identified. The transmitter 1610 transmits the RS in an identified bandwidth location.

The controller 1620 controls an operation of the transmitter 1610, and bandwidth location evaluation unit 1630 according to an embodiment of the present invention While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for assigning information related to a Demodulation (DM) Reference Signal (RS) associated with transmission of Physical Uplink Shared Channel (PUSCH) or Physical Uplink Control Channel (PUCCH) in a communication system, wherein a Base Station (BS) transmits in Physical Downlink Control Channels (PDCCHs) a respective set of Downlink Control Information (DCI) formats to a plurality of UEs, the method comprising the steps of:

indicating, by the BS, through an RS Configuration (RSC) Information Element (IE) included in a first DCI format from a subset of a set of DCI formats, a first Cyclic Shift (CS) and a first Orthogonal Cover Code (OCC) for the first RS transmission by the first UE; and indicating, by the BS, through an RSC IE in a second DCI format from a subset of the set of DCI formats, a second CS and a second OCC for the second RS transmission by the second UE, wherein each DCI format from a subset of the set of DCI formats includes IEs configuring data and RS transmissions from the plurality of UEs to the BS, and the IEs include an RSC IE for an RS transmission by a UE.

2. The method of claim 1, wherein a first set of CSs is associated with the first OCC and a second set of CS is associated with the second OCC, and
wherein the first set of CSs and the second set of CSs do not have any common elements.

3. The method of claim 2, wherein all elements in the first set of CSs or in the second set of CSs are separated by a same value.

4. The method of claim 1, wherein the first UE belongs to a first class of UEs and is assigned the first OCC for its RS transmission, and the second UE belongs to a second class of UEs and is assigned either the first or the second OCC for its RS transmission.

5. The method of claim 4, wherein the set of CSs associated with the first OCC for the first class of UEs does not have any common elements with the set of CSs associated with the first OCC for the second class of UEs.

6. The method of claim 1, wherein at least one of the OCCs indicates one of $\{1,1\}$ and $\{1,-1\}$.

7. The method of claim 1, wherein at least one of the CSs indicates one of a 0, 6, 3, 4, 2, 8, 10, and 9 shift of the CAZAC-based sequence.

8. The method of claim 1, wherein the DM RS sequence is configured by:

$$r^{(\alpha)}(n)=e^{j\alpha n}\bar{r}(n),$$

where $\bar{r}(n)$ the CAZAC-based sequence, $\alpha=2\pi n_{CS}/12$ is a shift value of the CAZAC-based sequence, and $n_{cs}$ is determined based on $(N_{DMRS}+n_{DMRS})$ mod 12,
where $N_{DMRS}$ is configured by a higher layer and $n_{DMRS}$ corresponds to the CS.

9. The method of claim 1, wherein the plurality of IEs for the RSC information indicates one of '000', '001', '010', '011', '100', '101', '110' and '111'.

10. A Base Station (BS) for assigning information related to a Demodulation (DM) Reference Signal (RS) associated with transmission of Physical Uplink Shared Channel (PUSCH) or Physical Uplink Control Channel (PUCCH) in a communication system, wherein a Base Station (BS) transmits in Physical Downlink Control Channels (PDCCHs) a respective set of Downlink Control Information (DCI) formats to a plurality of UEs, the BS comprising:

a controller for indicating, by the BS, through an RS Configuration (RSC) Information Element (IE) included in a first DCI format from a subset of a set of Downlink Control Information (DCI) formats, a first Cyclic Shift (CS) and a first Orthogonal Cover Code (OCC) for the first RS transmission by the first UE, and indicating through an RSC IE in a second DCI format from a subset of the set of DCI formats, a second CS and a second OCC for the second RS transmission by the second UE,
wherein each DCI format from a subset of the set of DCI formats includes IEs configuring data and RS transmissions from the plurality of UEs to the BS, and the IEs include an RSC IE for an RS transmission by a UE.

11. The BS of claim 10, wherein at least one of the OCCs indicates one of $\{1,1\}$ and $\{1,-1\}$.

12. The BS of claim 10, wherein at least one of the CSs indicates one of a 0, 6, 3, 4, 2, 8, 10, and 9 shift of the CAZAC-based sequence.

13. The BS of claim 10, wherein the DM RS sequence is configured by:

$$r^{(\alpha)}(n)=e^{j\alpha n}\bar{r}(n)$$

where $\bar{r}(n)$ the CAZAC-based sequence, $\alpha=2\pi n_{CS}/12$ is a shift value of the CAZAC-based sequence, and $n_{cs}$ is determined based on $(N_{DMRS}+n_{DMRS})$ mod 12,
where $N_{DMRS}$ is configured by a higher layer and $n_{DMRS}$ corresponds to the CS.

14. The BS of claim 10, wherein the plurality of IEs for the RSC information indicates one of '000', '001', '010', '011', '100', '101', '110' and '111'.

* * * * *